(12) United States Patent
Chuang et al.

(10) Patent No.: US 12,527,106 B2
(45) Date of Patent: Jan. 13, 2026

(54) MULTI-CHIP IMAGE SENSOR

(71) Applicant: TAIWAN SEMICONDUCTOR MANUFACTURING COMPANY, LTD., Hsinchu (TW)

(72) Inventors: Chun-Hao Chuang, Hsinchu (TW); Keng-Yu Chou, Kaohsiung (TW); Cheng Yu Huang, Hsinchu (TW); Wen-Hau Wu, New Taipei (TW); Wei-Chieh Chiang, Changhua County (TW); Chih-Kung Chang, Hsinchu County (TW); Tzu-Hsuan Hsu, Kaohsiung (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 489 days.

(21) Appl. No.: 17/837,534

(22) Filed: Jun. 10, 2022

(65) Prior Publication Data

US 2023/0402477 A1 Dec. 14, 2023

(51) Int. Cl.
*H10F 39/00* (2025.01)
*H10F 39/18* (2025.01)

(52) U.S. Cl.
CPC ......... *H10F 39/807* (2025.01); *H10F 39/014* (2025.01); *H10F 39/024* (2025.01);
(Continued)

(58) Field of Classification Search
CPC .... H10F 39/807; H10F 39/014; H10F 39/024; H10F 39/18; H10F 39/8037;
(Continued)

(56) References Cited

U.S. PATENT DOCUMENTS 9,838,620 B2 * 12/2017 Chao .................. H10F 39/813
9,985,072 B1 * 5/2018 Wen .................... H10F 39/805
(Continued)

FOREIGN PATENT DOCUMENTS

TW 202207442 A 2/2022

*Primary Examiner* — Caleb E Henry
(74) *Attorney, Agent, or Firm* — Sterne, Kessler, Goldstein & Fox P.L.L.C.

(57) ABSTRACT

The present disclosure describes a three-chip complementary metal-oxide-semiconductor (CMOS) image sensor and a method for forming the image sensor. The image sensor a first chip including a plurality of image sensing elements, transfer transistors and diffusion wells corresponding to the plurality of image sensing elements, a ground node shared by the plurality of image sensing elements, and deep trench isolation (DTI) structures extending from the shared ground node and between adjacent image sensing elements of the plurality of image sensing elements. The image sensor further includes a second chip bonded to the first chip and including a source follower, a reset transistor, a row select transistor, and an in-pixel circuit, where the source follower is electrically coupled to the diffusion wells. The image sensor further includes a third chip bonded to the second chip and including an application-specific circuit, where the application-specific circuit is electrically coupled to the in-pixel circuit.

20 Claims, 23 Drawing Sheets

(52) U.S. Cl.
CPC ......... *H10F 39/18* (2025.01); *H10F 39/8037* (2025.01); *H10F 39/809* (2025.01); *H10F 39/811* (2025.01)

(58) Field of Classification Search
CPC .... H10F 39/809; H10F 39/811; H10F 39/182; H10F 39/199; H10F 39/8053; H10F 39/8063; H10F 39/813; H01L 27/14621; H01L 27/14623; H01L 27/14627; H01L 27/1463; H01L 27/14645; H04N 25/70; H04N 25/77
See application file for complete search history.

(56) References Cited

U.S. PATENT DOCUMENTS

| | | | | |
|---|---|---|---|---|
| 10,075,704 | B2* | 9/2018 | Hoekstra | H04N 17/002 |
| 10,644,060 | B2* | 5/2020 | Cheng | H10F 39/024 |
| 2012/0147237 | A1* | 6/2012 | Xu | H10F 39/803 |
| | | | | 348/301 |
| 2012/0217374 | A1* | 8/2012 | Nishizawa | H10F 39/811 |
| | | | | 257/E23.141 |
| 2012/0241895 | A1* | 9/2012 | Kurogi | H10F 39/199 |
| | | | | 257/431 |
| 2013/0037900 | A1* | 2/2013 | Abe | H10F 39/802 |
| | | | | 438/57 |
| 2013/0285180 | A1* | 10/2013 | Wang | H10F 39/011 |
| | | | | 257/E31.127 |
| 2014/0117429 | A1* | 5/2014 | Nomoto | H10F 39/8023 |
| | | | | 257/292 |
| 2015/0035028 | A1* | 2/2015 | Fan | H04N 25/616 |
| | | | | 257/292 |
| 2015/0055002 | A1* | 2/2015 | Beck | H04N 25/59 |
| | | | | 348/308 |
| 2016/0211293 | A1* | 7/2016 | Wei | H10F 39/80373 |
| 2017/0005129 | A1* | 1/2017 | Roy | H04N 25/78 |
| 2017/0005130 | A1* | 1/2017 | Roy | H10F 39/18 |
| 2017/0301718 | A1* | 10/2017 | Chou | H04N 25/704 |
| 2018/0033809 | A1* | 2/2018 | Tayanaka | H10D 89/60 |
| 2018/0220092 | A1* | 8/2018 | Takaya | H04N 25/62 |
| 2019/0124286 | A1* | 4/2019 | Huang | H10F 39/807 |
| 2019/0149758 | A1* | 5/2019 | Nakamura | H04N 25/79 |
| | | | | 348/187 |
| 2020/0035722 | A1* | 1/2020 | Toyoguchi | G06T 7/55 |
| 2020/0098798 | A1* | 3/2020 | Takahashi | H10F 39/199 |
| 2020/0135667 | A1* | 4/2020 | Lin | H01L 24/17 |
| 2020/0252603 | A1* | 8/2020 | Steadman | H04N 25/79 |
| 2021/0074758 | A1* | 3/2021 | Takahashi | H10F 39/8063 |
| 2021/0273071 | A1* | 9/2021 | Lee | H01L 21/302 |
| 2021/0296378 | A1* | 9/2021 | Fukui | H04N 25/70 |
| 2021/0366953 | A1* | 11/2021 | Hsu | H10F 39/811 |
| 2021/0366954 | A1* | 11/2021 | Chen | H10F 39/807 |
| 2021/0400225 | A1* | 12/2021 | Manda | H04N 25/68 |
| 2022/0139991 | A1 | 5/2022 | Kim et al. | |
| 2022/0165768 | A1 | 5/2022 | Kim et al. | |
| 2022/0320156 | A1* | 10/2022 | Kawamura | H10F 39/18 |

\* cited by examiner

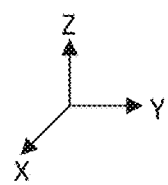
FIG. 13
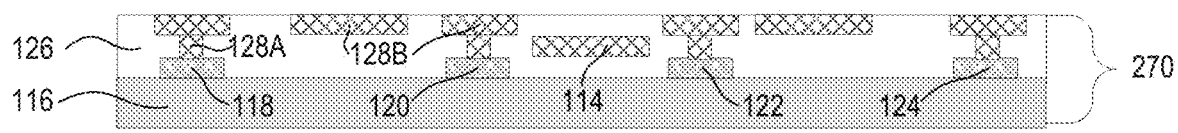
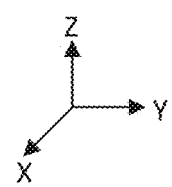
FIG. 14

MULTI-CHIP IMAGE SENSOR

BACKGROUND

Semiconductor image sensors are used to sense radiation, such as light, and convert the sensed radiation into electrical signals. These devices utilize an array of pixels, such as photodiodes, to sense radiation that is projected toward the pixels. Complementary metal-oxide-semiconductor (CMOS) image sensors are used in various applications, such as digital still cameras and mobile phone cameras.

BRIEF DESCRIPTION OF THE DRAWINGS

Aspects of the present disclosure are best understood from the following detailed description when read with the accompanying figures.

FIGS. 10-22 illustrate cross-sectional views of a three-chip CMOS image sensor at various stages of its fabrication process, in accordance with some embodiments.

DETAILED DESCRIPTION

Figure 1:
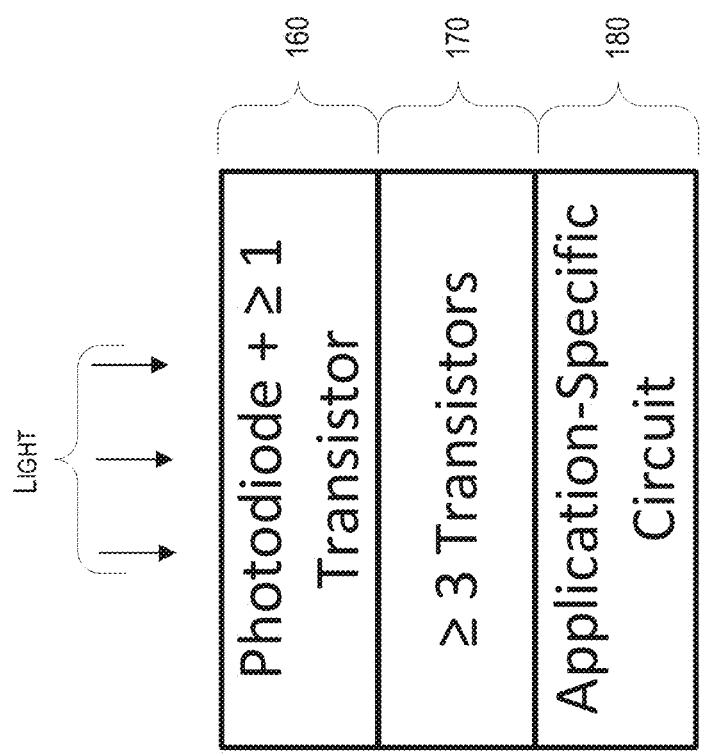
FIG. 1 is a diagram of a three-chip CMOS image sensor, in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the process for forming a first feature over a second feature in the description that follows may include embodiments in which the first and second features are formed in direct contact, and may also include embodiments in which additional features may be formed between the first and second features, such that the first and second features may not be in direct contact. As used herein, the formation of a first feature on a second feature means the first feature is formed in direct contact with the second feature. In addition, the present disclosure may repeat reference numerals and/or letters in the various examples. This repetition does not in itself dictate a relationship between the embodiments and/or configurations discussed herein.

Spatially relative terms, such as "beneath," "below," "lower," "above," "upper," and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

It is noted that references in the specification to "one embodiment," "an embodiment," "an example embodiment," "exemplary," etc., indicate that the embodiment described may include a particular feature, structure, or characteristic, but every embodiment may not necessarily include the particular feature, structure, or characteristic. Moreover, such phrases do not necessarily refer to the same embodiment. Further, when a particular feature, structure or characteristic is described in connection with an embodiment, it would be within the knowledge of one skilled in the art to effect such feature, structure or characteristic in connection with other embodiments whether or not explicitly described.

It is to be understood that the phraseology or terminology herein is for the purpose of description and not of limitation, such that the terminology or phraseology of the present specification is to be interpreted by those skilled in relevant art(s) in light of the teachings herein.

In some embodiments, the terms "about" and "substantially" can indicate a value of a given quantity that varies within 5% of the value (e.g., ±1%, ±2%, ±3%, ±4%, ±5% of the value). These values are merely examples and are not intended to be limiting. The terms "about" and "substantially" can refer to a percentage of the values as interpreted by those skilled in relevant art(s) in light of the teachings herein.

The discussion of elements in FIGS. 2-8, 10-22, and 24-31 with the same annotations applies to each other, unless mentioned otherwise.

Complementary metal-oxide-semiconductor (CMOS) image sensors are used in various applications, such as digital still cameras and mobile phone cameras. CMOS image sensors can include an array of image sensing elements or pixels, such as photodiodes. The pixels can sense radiation, such as light, that is projected toward the pixels. CMOS image sensors can further include transfer transistors, diffusion wells, source followers, reset transistors, row select transistors, in-pixel circuits, and application-specific circuits. These transistors and circuits can convert the sensed radiation into electrical signals. In a two-chip design of CMOS image sensors, the pixels, the transfer transistors, the diffusion wells, the source followers, the reset transistors, the row select transistors, and the in-pixel circuits can be formed on a first chip, and the application-specific circuits can be formed on a second chip. As the semiconductor industry continues to scale down the dimensions of the pixels, the sizes of the transfer transistors, the source followers, the reset transistors, and the row select transistors are decreased. The decreased sizes of these transistors can increase the noise of these transistors. The scaling down of the pixels also leaves less chip space for deep trench isolation (DTI) structures. DTI structures with smaller widths can increase the light crosstalk between the pixels and the electrical crosstalk between the transistors. Both the increased noise and the increased crosstalk reduce device performance.

The present disclosure provides example three-chip CMOS image sensors and example methods for fabricating the same. In some embodiments, in a three-chip design of CMOS image sensors, the pixels, the transfer transistors, and the diffusion wells can be formed on a first chip. The source followers, the reset transistors, the row select transistors, and the in-pixel circuits can be formed on a second chip. The application-specific circuits can be formed on a third chip. The second chip can be bonded to the first chip. The third chip can be bonded to the second chip. Each of the three chips can include interconnect structures, such as metal vias, metal lines, and through-silicon vias (TSVs). The interconnect structures can electrically couple the three chips to one another. The first chip can further include DTI structures, color filters, and micro lenses. Compared to two-chip CMOS image sensors, three-chip CMOS image sensors have an additional chip to house the source followers, the reset transistors, and the row select transistors. Therefore, the sizes of these transistors can be increased. The sizes of the transfer transistors on the first chip can also be increased as a result of the source followers, the reset transistors, and the row select transistors being on the second chip. The increased sizes of these transistors can reduce the noise of these transistors. Also, as a result of the source followers, the reset transistors, and the row select transistors being on the second chip, there can be more chip space on the first chip for the DTI structures. DTI structures with greater widths can reduce the light crosstalk between the pixels and the electrical crosstalk between the transistors. Both the decreased noise and the decreased crosstalk in the three-chip CMOS image sensors can improve device performance.

In some embodiments, several pixels can share one diffusion well or one ground node on the first chip, and the DTI structures can extend from the shared diffusion well or the shared ground node to the ends of the pixels. By sharing the diffusion well or the ground node, more chip space can be available for fabricating the DTI structures. The DTI structures can have increased widths and achieve greater isolation between the pixels. This can further decrease the crosstalk in the three-chip CMOS image sensors and improve device performance.

FIG. 1 is a diagram of a three-chip CMOS image sensor, according to some embodiments. The three-chip CMOS image sensor can include a first chip 160, a second chip 170, and a third chip 180. First chip 160 can include a photodiode and at least one transistor, such as a transfer transistor. The photodiode can sense light directed toward it. Second chip 170 can include at least three transistors, such as a source follower, a reset transistor, and a row select transistor. In some embodiments, second chip 170 can also include an in-pixel circuit. The in-pixel circuit can include a column amplifier, a correlated double sampling (CDS) circuit, and combinations thereof. Third chip 180 can include an application-specific circuit. The application-specific circuit can include an analog-to-digital converter (ADC), a counter, a memory storage device, and combinations thereof.

Figure 2:
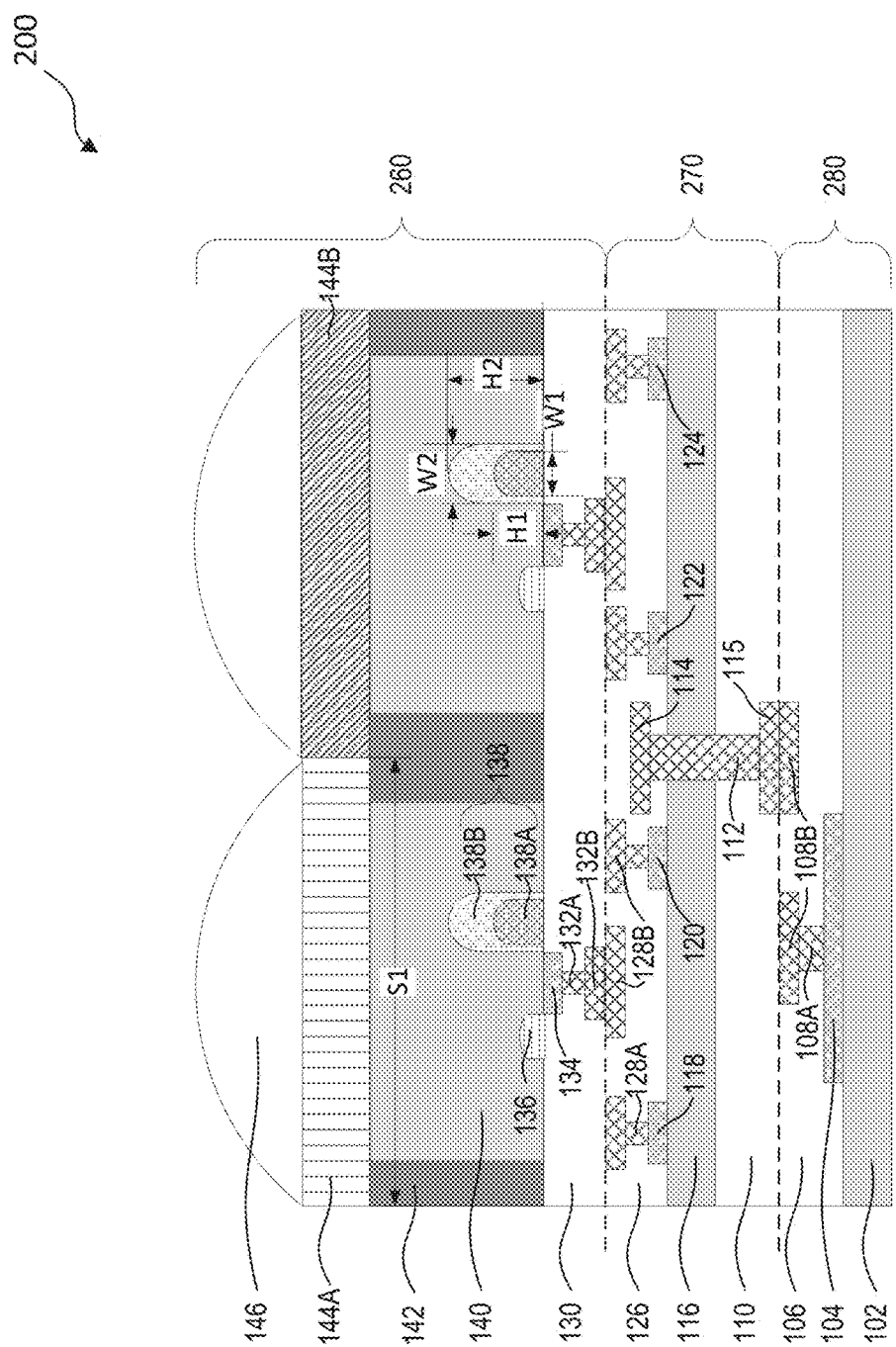
FIG. 2 illustrates a cross-sectional view of a three-chip CMOS image sensor, in accordance with some embodiments.

FIG. 2 illustrates a cross-sectional view of a three-chip CMOS image sensor 200, according to some embodiments. Three-chip CMOS image sensor 200 can include a first chip 260, a second chip 270, and a third chip 280. Second chip 270 is bonded to first chip 260, and third chip 280 is bonded to second chip 270. First chip 260 can include a first substrate 140, a first interlayer dielectric (ILD) layer 130, a transfer transistor 134, a diffusion well 136, a photodiode 138, a first interconnect structure including metal vias 132A and metal lines 132B, a DTI structure 142, color filters 144A and 144B, and micro lenses 146. Second chip 270 can include a second substrate 116, a second ILD layer 126, a source follower 118, a reset transistor 120, a row select transistor 122, an in-pixel circuit 124, a second interconnect structure including metal vias 128A and metal lines 128B and 114, a third ILD layer 110, a TSV 112, and a metal line 115. Source follower 118, reset transistor 120, row select transistor 122, and in-pixel circuit 124 can be vertically, such as in the z-direction, displaced from transfer transistor 134. Third chip 280 can include a third substrate 102, a fourth ILD layer 106, an application-specific circuit 104, and a third interconnect structure including metal vias 108A and metal lines 108B. Application-specific circuit 104 can be vertically, such as in the z-direction, displaced from transfer transistor 134, source follower 118, reset transistor 120, row select transistor 122, and in-pixel circuit 124.

First substrate 140, second substrate 116, and third substrate 102 can be a semiconductor material, such as silicon (Si), germanium (Ge), silicon germanium (SiGe), a silicon-on-insulator (SOI) structure, and combinations thereof. Further, first substrate 140, second substrate 116, and third substrate 102 can be doped with p-type dopants, such as boron (B), indium (In), aluminum (Al), and gallium (Ga), or n-type dopants, such as phosphorous (P) and arsenic (As).

First ILD layer 130, second ILD layer 126, third ILD layer 110, fourth ILD layer 106, and DTI structure 142 can include an insulating material, such as silicon oxide ($SiO_x$), silicon nitride (SiN), silicon carbon nitride (SiCN), silicon oxycarbon nitride (SiOCN), and silicon germanium oxide ($SiGeO_x$).

Metal vias 132A, 128A, and 108A, metal lines 132B, 128B, 114, 115, and 108B, and TSV 112 can include a suitable conductive material, such as tungsten (W), molybdenum (Mo), nickle (Ni), bismuth (Bi), scandium (Sc), titanium (Ti), copper (Cu), cobalt (Co), silver (Ag), aluminum (Al), titanium aluminum nitride (TiAlN), tantalum carbide (TaC), tantalum carbonitride (TaCN), tantalum silicon nitride (TaSiN), manganese (Mn), zirconium (Zr), titanium nitride (TiN), tantalum nitride (TaN), ruthenium (Ru), tungsten nitride (WN), titanium carbide (TiC), titanium aluminum carbide (TiAlC), tantalum aluminum carbide (TaAlC), metal alloys, and combinations thereof. The first interconnect structure including metal vias 132A and metal lines 132B and the second interconnect structure including metal vias 128A and metal lines 128B can electrically couple first chip 260 to second chip 270. TSV 112, metal line 115, and the third interconnect structure including metal vias 108A and metal lines 108B can electrically couple second chip 270 to third chip 280. TSV 112 and metal line 114 can electrically couple first chip 260 to third chip 280 through second chip 270.

In some embodiments, metal vias 132A, 128A, and 108A, metal lines 132B, 128B, 114, 115, and 108B, and TSV 112 can include a barrier layer (not shown in FIG. 2). The barrier layer can include any suitable materials, such as a metal oxide ($MO_x$), a metal nitride ($MN_x$), a metal carbide ($MC_x$), a metalaluminate ($MAl_xO_y$), a combination of metal oxides ($M1O_x/M2O_x$), a metal-silicate ($MSiO_x$), and combinations thereof. In some embodiments, the metal in the above-mentioned materials is a transition metal, such as hafnium (Hf), Zr, Ti, and Al, a rare earth metal, such as yttrium (Y), ytterbium (Yb), erbium (Er), and combinations thereof. In some embodiments, the barrier layer can include dielectric materials, such as SiN, SiOCN, SiCN, other suitable insulating materials, and combination thereof. In some embodiments, the thickness of the barrier layer can be between about 1 nm and about 10 nm.

Transfer transistor 134, source follower 118, reset transistor 120, row select transistor 122, in-pixel circuit 124, and application-specific circuit 104 can include a gate structure. The gate structure can include multiple layers (not shown in FIG. 2). The gate structure can include an interfacial oxide (IO) layer (not shown in FIG. 2), a high-k (HK) dielectric layer (not shown in FIG. 2) disposed on the IO layer, and a conductive layer (not shown in FIG. 2) disposed on the HK dielectric layer. The IO layer can include $SiO_x$, $SiGeO_x$, and $GeO_x$. The HK dielectric layer can include a HK dielectric material, such as hafnium oxide ($HfO_2$), titanium oxide ($TiO_2$), hafnium zirconium oxide (HfZrO), tantalum oxide ($Ta_2O_3$), hafnium silicate ($HfSiO_4$), zirconium oxide ($ZrO_2$), and zirconium silicate ($ZrSiO_2$). The HK dielectric layer can have a thickness between about 1 nm and about 10 nm. The conductive layer can have multiple layers (not shown in FIG. 2). The conductive layer can include a work function metal (WFM) layer disposed on the HK dielectric layer and a metal fill layer disposed on the WFM layer. In some embodiments, the WFM layer can include titanium aluminum (TiAl), TiAlC, tantalum aluminum (TaAl), TaAlC, Al-doped Ti, Al-doped TiN, Al-doped tantalum Ta, Al-doped TaN, other suitable Al-based materials, substantially Al-free (e.g., with no Al) Ti-based or Ta-based nitrides or alloys, such as TiN, titanium silicon nitride (TiSiN), titanium gold (Ti—Au) alloy, titanium copper (Ti—Cu) alloy, TaN, TaSiN, tantalum gold (Ta—Au) alloy, tantalum copper (Ta—Cu) alloy, and combinations thereof. The metal fill layer can include a suitable conductive material, such as W, low-fluorine tungsten (LFW), Ti, Ag, Ru, Mo, Cu, Co, Al, iridium (Ir), nickel (Ni), metal alloys, and combinations thereof. The metal fill layer can have a thickness between about 2 nm and about 100 nm. The gate structure can have gate contacts (not shown in FIG. 2) that include a suitable conductive material, such as W. The gate structure can be a planar gate structure or a fin field effect transistor (finFET). In-pixel circuit 124 and application-specific circuit 104 can include circuit elements other than a transistor.

Diffusion well 136 can be a doped region disposed in substrate 140 that functions as a source/drain (S/D) region. Diffusion well 136 can include a semiconductor material, such as Si and SiGe. Diffusion well 136 can be doped with p-type dopants, such as B and other suitable p-type dopants. Diffusion well 136 can be doped with n-type dopants, such as P and other suitable n-type dopants. A dopant concentration of diffusion well 136 can be in a range from about $1\times10^{20}$ atoms/cm$^3$ to about $3\times10^{22}$ atoms/cm$^3$. In some embodiments, diffusion well 136 can have a depth of about 50 nm to about 70 nm. Diffusion well 136 can be adjacent to transfer transistor 134. Source follower 118, reset transistor 120, row select transistor 122, in-pixel circuit 124, and application-specific circuit 104 can include S/D regions (not shown in FIG. 2) similar to diffusion well 136. Source follower 118, reset transistor 120, row select transistor 122, in-pixel circuit 124, and application-specific circuit 104 can further include S/D contacts (not shown in FIG. 2) on the S/D regions. The S/D contacts can include a suitable conductive material, such as W.

Photodiode 138 can include two oppositely-doped regions disposed in substrate 140. For example, photodiode 138 can include a first doped region 138A and a second doped region 138B. First doped region 138A and second doped region 138B can include a semiconductor material, such as Si and SiGe. First doped region 138A can be n-doped and second doped region 138B can be p-doped. Alternatively, first doped region 138A can be p-doped and second doped region 138B can be n-doped. N-doped regions can be doped with n-type dopants, such as P and other suitable n-type dopants. P-doped regions can be doped with p-type dopants, such as B and other suitable n-type dopants. A dopant concentration of first doped region 138A and second doped region 138B can be in a range from about $1\times10^{20}$ atoms/cm$^3$ to about $3\times10^{22}$ atoms/cm$^3$, from about $0.8\times10^{20}$ atoms/cm$^3$ to about $3.3\times10^{22}$ atoms/cm$^3$, and from about $0.5\times10^{20}$ atoms/cm$^3$ to about $3.5\times10^{22}$ atoms/cm$^3$. If the dopant concentration is less than about $0.5\times10^{20}$ atoms/cm$^3$, photodiode 138 cannot effectively sense radiation. Photodiode 138 cannot effectively sense radiation if the total generated photocurrent density is below about 10 nA/cm$^2$. If the dopant concentration is greater than about $3.5\times10^{22}$ atoms/cm$^3$, the manufacturing cost of forming photodiode 138 can be too high.

First doped region 138A can have a width W1 between about 50 nm and about 100 nm, between about 30 nm and about 150 nm, and between about 10 nm and about 200 nm. First doped region 138A can have a height H1 between about 100 nm and about 150 nm, between about 70 nm and about 200 nm, and between about 50 nm and about 250 nm. Second doped region 138B can have a width W2 between about 70 nm and about 120 nm, between about 50 nm and about 180 nm, and between about 30 nm and about 250 nm. Second doped region 138B can have a height H2 between about 200 nm and about 300 nm, between about 150 nm and about 400 nm, and between about 100 nm and about 500 nm. A ratio W2/W1 can be between about 1.5 and about 3, between about 1.3 and about 4, and between about 1.1 and about 5. A ratio H2/H1 can be between about 2 and about 5, between about 1.5 and about 8, and between about 1.2 and about 10. If W1 is less than about 10 nm, H1 is less than about 50 nm, W2 is less than about 30 nm, H2 is less than about 100 nm, W2/W1 is less than about 1.1, or H2/H1 is less than about 1.2, photodiode 138 cannot effectively sense radiation. Photodiode 138 cannot effectively sense radiation if the total generated photocurrent density is below about 10 nA/cm$^2$. If W1 is greater than about 200 nm, H1 is greater than about 250 nm, W2 is greater than about 250 nm, H2 is greater than about 500 nm, W2/W1 is greater than about 5, or H2/H1 is greater than about 10, the size of photodiode 138 can be too great. The size of photodiode 138 can be too great, if the resulting pixel size S1 is greater than about 8 μm. Photodiode 138 can be adjacent to transfer transistor 134.

Color filters 144A and 144B can include a color photoresist disposed on the pixels. The color photoresist can include pigments or dyes. Color filter 144A can transmit radiation having wavelengths within a first range. For example, color filter 144A can pass red light to the pixels. Color filter 144B can transmit radiation having wavelengths within a second range. For example, color filter 144B can pass blue light to the pixels. In some embodiments, color filters 144A and 144B can transmit radiation having the same wavelengths.

Micro lenses 146 can include a polymer material with a round shape and disposed on color filters 144A and 144B. Micro lenses 146 can focus the incident radiation towards the pixels.

Figure 3:
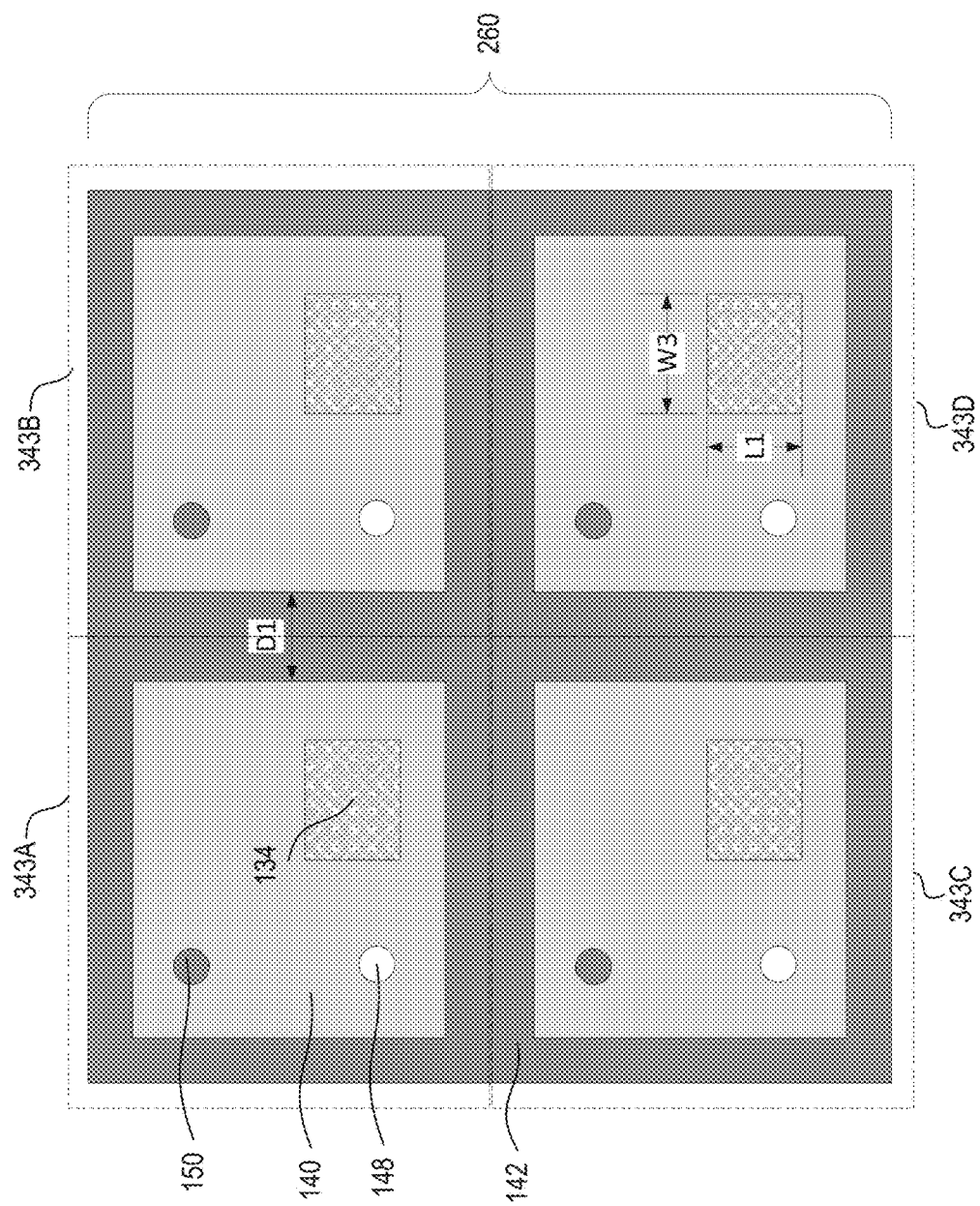
FIG. 3 illustrates a top view of a first chip of a three-chip CMOS image sensor, in accordance with some embodiments.

FIG. 3 illustrates a top view of first chip 260 of three-chip CMOS image sensor 200, according to some embodiments. FIG. 3 illustrates four pixels 343A-343D disposed on first substrate 140. The four pixels 343A-343D can be isolated from each other by DTI structure 142. DTI structure 142 can form sections on first chip 260, and each section can include one image sensing element 138, one transfer transistor 134, one ground node 150, and one diffusion well 136 or one floating node 148. DTI structure 142 can provide a separation D1 between about 50 nm and about 250 nm, between about 40 nm and about 300 nm, and between about 30 nm and about 350 nm. If D1 is less than about 30 nm, the light crosstalk and the electrical crosstalk between the pixels can be too great. The light crosstalk and the electrical crosstalk can be too great, if either crosstalk is greater than about 80%. If D1 is greater than about 350 nm, the size of DTI structure 142 can be too great. The size of DTI structure 142 can be too great, if the resulting pixel size S1 is greater than about 8 μm. Each pixel can include transfer transistor 134, a floating node 148, and a ground node 150. Floating node 148 is a circuit node representing a connection point in the circuit having the same voltage potential as that of diffusion well 136. Ground node 150 is a circuit node representing a connection point in the circuit having the same voltage potential as that of the ground, which is typically 0 V and functions as a reference node for other circuit nodes. Transfer transistor 134 can have a width W3 between about 50 nm and about 100 nm, between about 30 nm and about 200 nm, and between about 10 nm and about 300 nm. Transfer transistor 134 can have a length L1 between about 100 nm and about 200 nm, between about 80 nm and about 400 nm, and between about 50 nm and about 800 nm. If W3 is less than about 10 nm, or L1 is less than about 50 nm, the noise of transfer transistor 134 can be too great. The noise of transfer transistor 134 can be too great, if the input referred voltage noise of transfer transistor 134 at 10 Hz is greater than about $10^{-10}$ $V^2/Hz$. If W3 is greater than about 300 nm, or L1 is greater than about 800 nm, the size of transfer transistor 134 can be too great. The size of transfer transistor 134 can be too great, if the resulting pixel size S1 is greater than about 8 μm. Because source follower 118, reset transistor 120, and row select transistor 122 are on second chip 270 (as compared to being on the first chip in two-chip CMOS image sensor designs), more space on first chip 260 can be used to form DTI structure 142 to provide a greater separation between pixels. Consequently, the light crosstalk and the electrical crosstalk between pixels can be reduced. More space on first chip 260 can also be used to form transfer transistor 134 with a greater size. Because the 1/f noise of a MOS transistor is inversely proportional to the area of the MOS transistor, the noise of transfer transistor 134 can be reduced.

Figure 4:
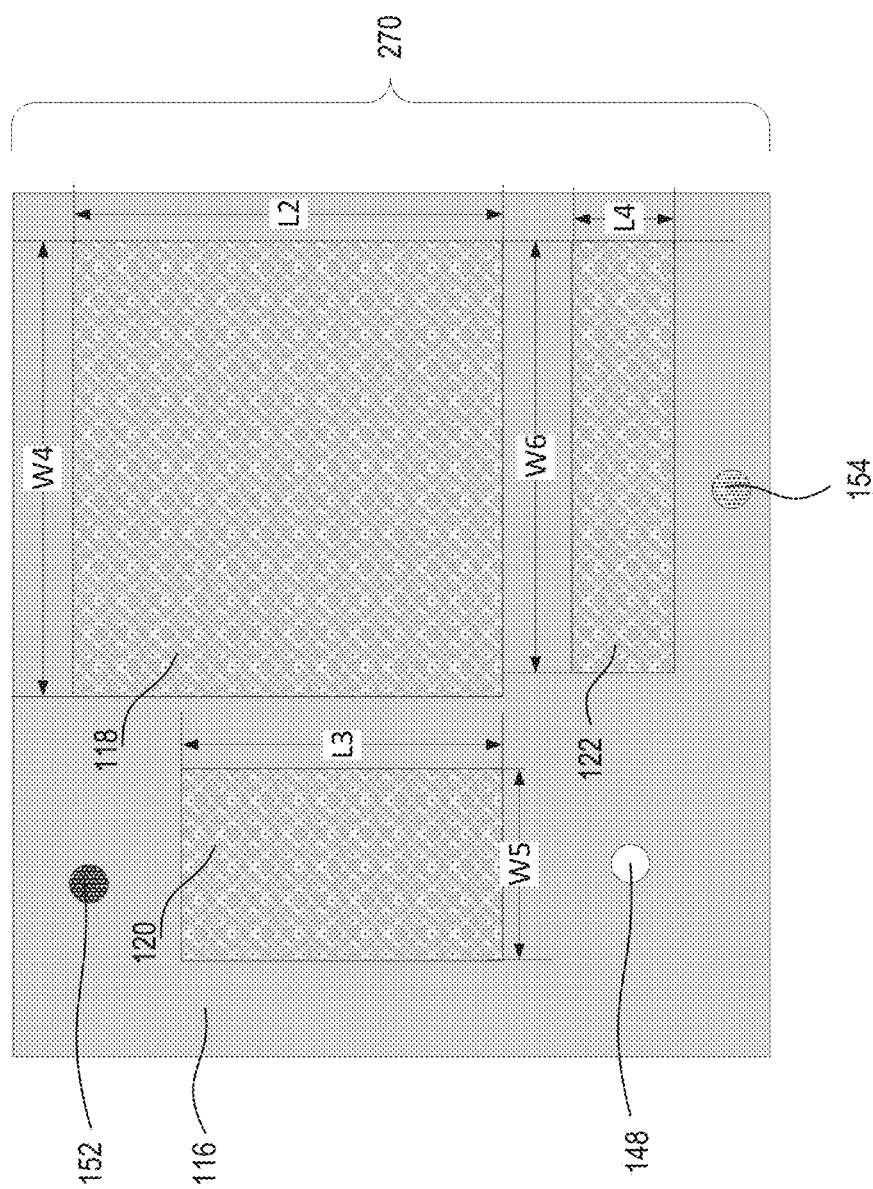
FIG. 4 illustrates a top view of a second chip of a three-chip CMOS image sensor, in accordance with some embodiments.

FIG. 4 illustrates a top view of second chip 270 of three-chip CMOS image sensor 200, according to some embodiments. Second chip 270 can include source follower 118, reset transistor 120, row select transistor 122, floating node 148, a Vdd node 152, and an in-pixel circuit node 154 disposed on second substrate 116. Vdd node 152 is a circuit node representing a connection point in the circuit having the same voltage potential as that of a power source. In-pixel circuit node 154 is a circuit node representing a connection point in the circuit having the same voltage potential as that of in-pixel circuit 124. Source follower 118 can have a width W4 between about 150 nm and about 300 nm, between about 90 nm and about 600 nm, and between about 30 nm and about 900 nm. Source follower 118 can have a length L2 between about 300 nm and about 1 μm, between about 240 nm and about 2 μm, and between about 150 nm and about 3 μm. If W4 is less than about 30 nm, or L2 is less than about 150 nm, the noise of source follower 118 can be too great. The noise of source follower 118 can be too great, if the input referred voltage noise of source follower 118 at 10 Hz is greater than about $10^{-10}$ $V^2/Hz$. If W4 is greater than about 900 nm, or L2 is greater than about 3 μm, the size of source follower 118 can be too great. The size of source follower 118 can be too great, if the resulting pixel size S1 is greater than about 8 μm.

Reset transistor 120 can have a width W5 between about 120 nm and about 250 nm, between about 60 nm and about 500 nm, and between about 10 nm and about 800 nm. Reset transistor 120 can have a length L3 between about 250 nm and about 800 nm, between about 180 nm and about 1.5 μm, and between about 120 nm and about 2 μm. If W5 is less than about 10 nm, or L3 is less than about 120 nm, the noise of reset transistor 120 can be too great. The noise of reset transistor 120 can be too great, if the input referred voltage noise of reset transistor 120 at 10 Hz is greater than about $10^{-10}$ $V^2/Hz$. If W5 is greater than about 800 nm, or L3 is greater than about 2 μm, the size of reset transistor 120 can be too great. The size of reset transistor can be too great, if the resulting pixel size S1 is greater than about 8 μm. Row select transistor 122 can have a width W6 between about 200 nm and about 350 nm, between about 100 nm and about 700 nm, and between about 50 nm and about 1.2 μm. Row select transistor 122 can have a length L4 between about 200 nm and about 600 nm, between about 150 nm and about 1.2 μm, and between about 100 nm and about 1.5 μm. If W6 is less than about 50 nm, or L4 is less than about 100 nm, the noise of row select transistor 122 can be too great. The noise of row select transistor 122 can be too great, if the input referred voltage noise of row select transistor 122 at 10 Hz is greater than about $10^{-10}$ $V^2/Hz$. If W6 is greater than about 1.2 μm, or L4 is greater than about 1.5 μm, the size of row select transistor 122 can be too great. The size of row select transistor 122 can be too great, if the resulting pixel size S1 is greater than about 8 μm. Because source follower 118, reset transistor 120, and row select transistor 122 are on second chip 270 (as compared to being on the first chip in two-chip CMOS image sensor designs), the additional space on second chip 270 can allow the sizes of source follower 118, reset transistor 120, and row select transistor 122 to be greater. Because the 1/f noise of a MOS transistor is inversely proportional to the area of the MOS transistor, the noise of source follower 118, reset transistor 120, and row select transistor 122 can be reduced.

Figure 5:
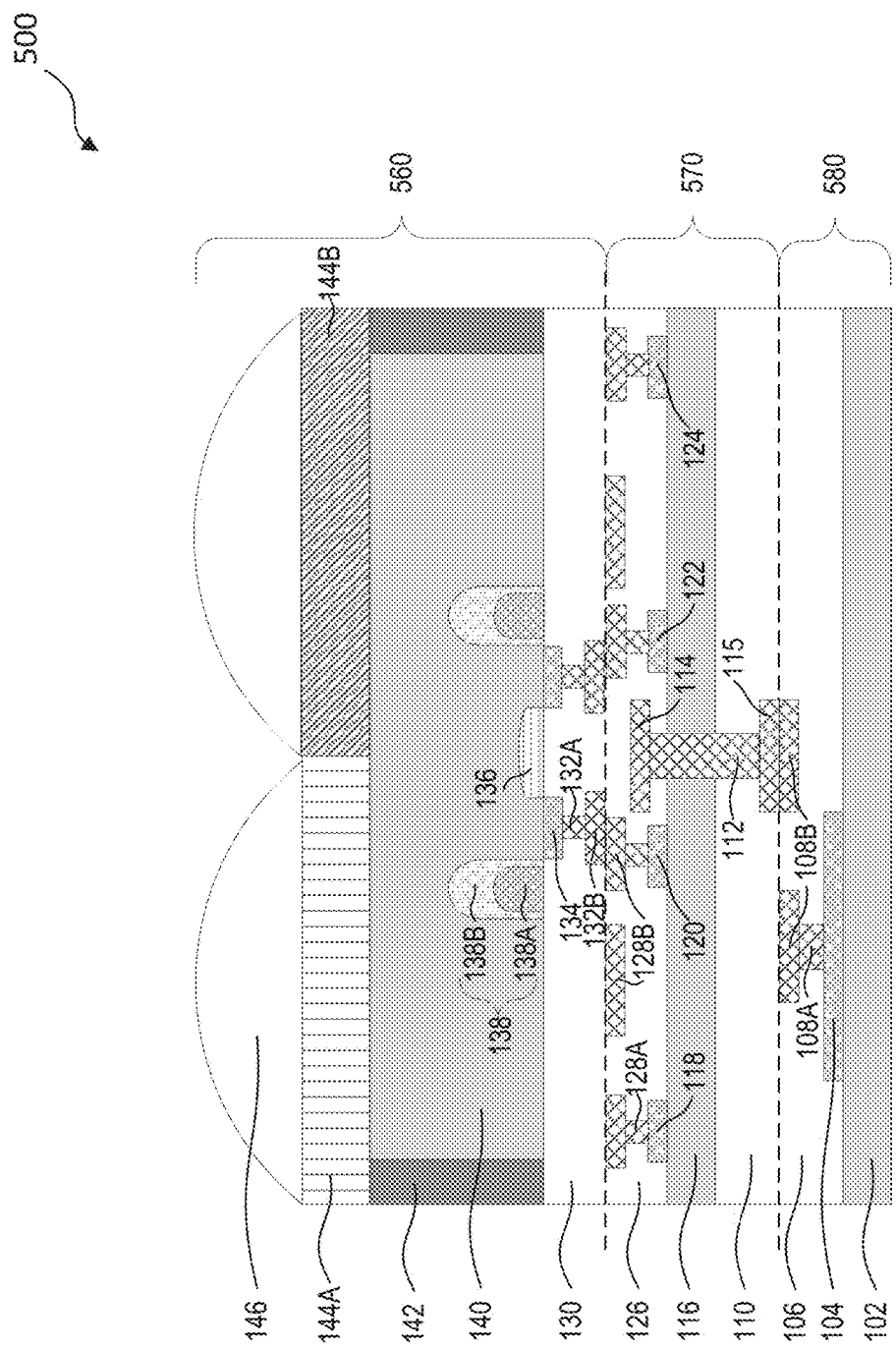
FIG. 5 illustrates a cross-sectional view of another three-chip CMOS image sensor, in accordance with some embodiments.

FIG. 5 illustrates a cross-sectional view of another three-chip CMOS image sensor 500, according to some embodiments. Three-chip CMOS image sensor 500 can include a first chip 560, a second chip 570, and a third chip 580. The discussion of elements in FIG. 5 with the same annotations as the elements in FIG. 2 applies to each other. Referring to FIG. 5, diffusion well 136 can be adjacent to two or more transfer transistors 134 and shared by the two or more transfer transistors 134. Diffusion well 136 can be shared by two or more photodiodes 138 through the coupling of the two or more transfer transistors 134. DTI structure 142 is absent at the location of the shared diffusion well 136.

Figure 6:
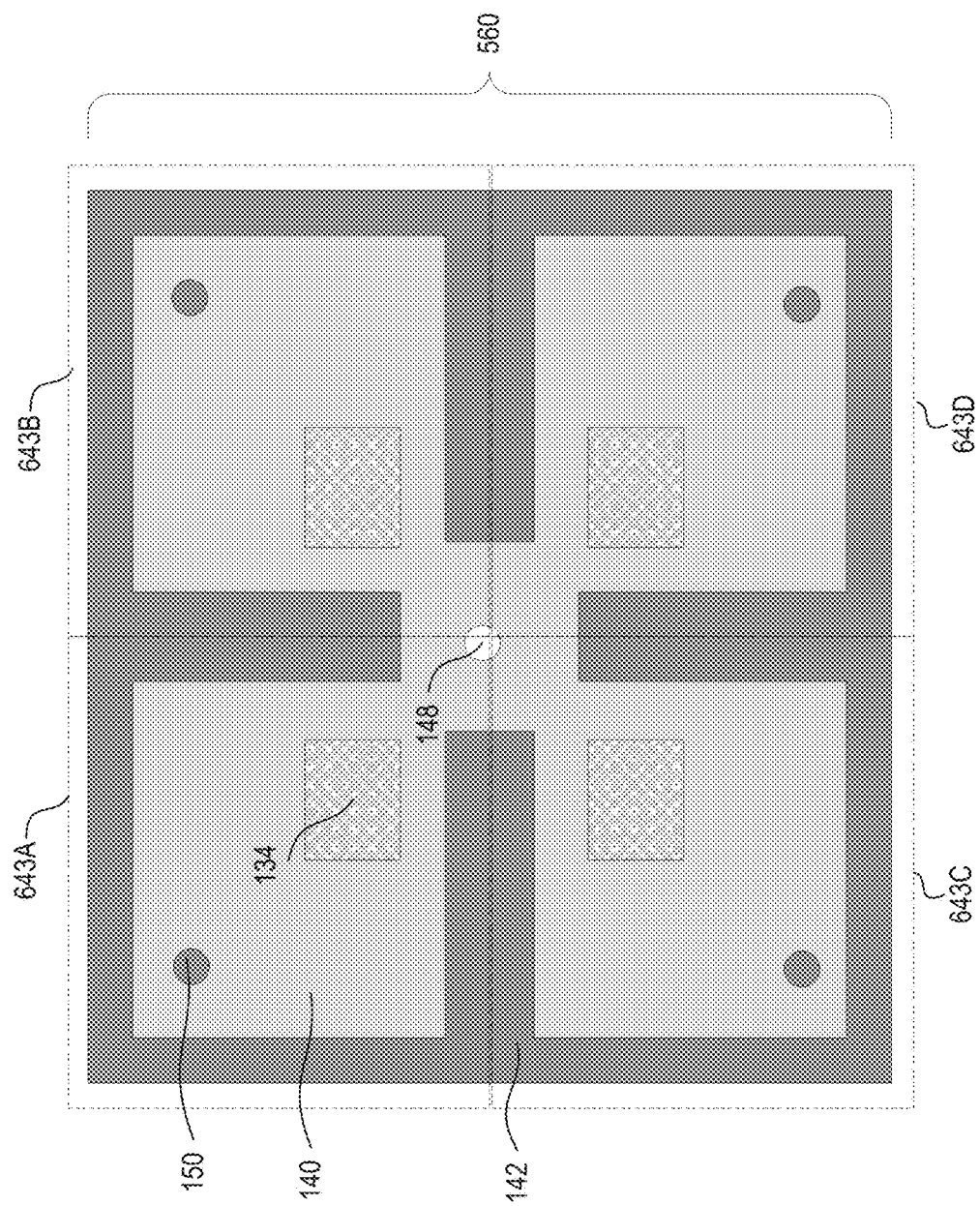
FIG. 6 illustrates a top view of a first chip of another three-chip CMOS image sensor, in accordance with some embodiments.

FIG. 6 illustrates a top view of first chip 560 of three-chip CMOS image sensor 500, according to some embodiments. FIG. 6 illustrates four pixels 643A-643D disposed on first substrate 140. DTI structure 142 can form sections on first chip 560, and each section can include one image sensing element 138, one transfer transistor 134, and one ground node 150. The four pixels 643A-643D share one floating node 148 while each pixel has its own ground node 150. Because the number of diffusion wells 136 is reduced, more space on first chip 560 can be used to form transfer transistor 134 with a greater size and the noise of transfer transistor 134 can be reduced. The four pixels 643A-643D can be isolated from each other by DTI structure 142. DTI structure 142 can extend from floating node 148 to the ends of the four pixels 643A-643D. DTI structure 142 can extend between adjacent pixels of the four pixels 643A-643D. Because DTI structure 142 is absent at the location of the shared floating node 148, more space on first chip 560 can be used to form DTI structure 142 to provide a greater separation between pixels. Consequently, the light crosstalk and the electrical crosstalk between the pixels can be reduced.

Figure 7:
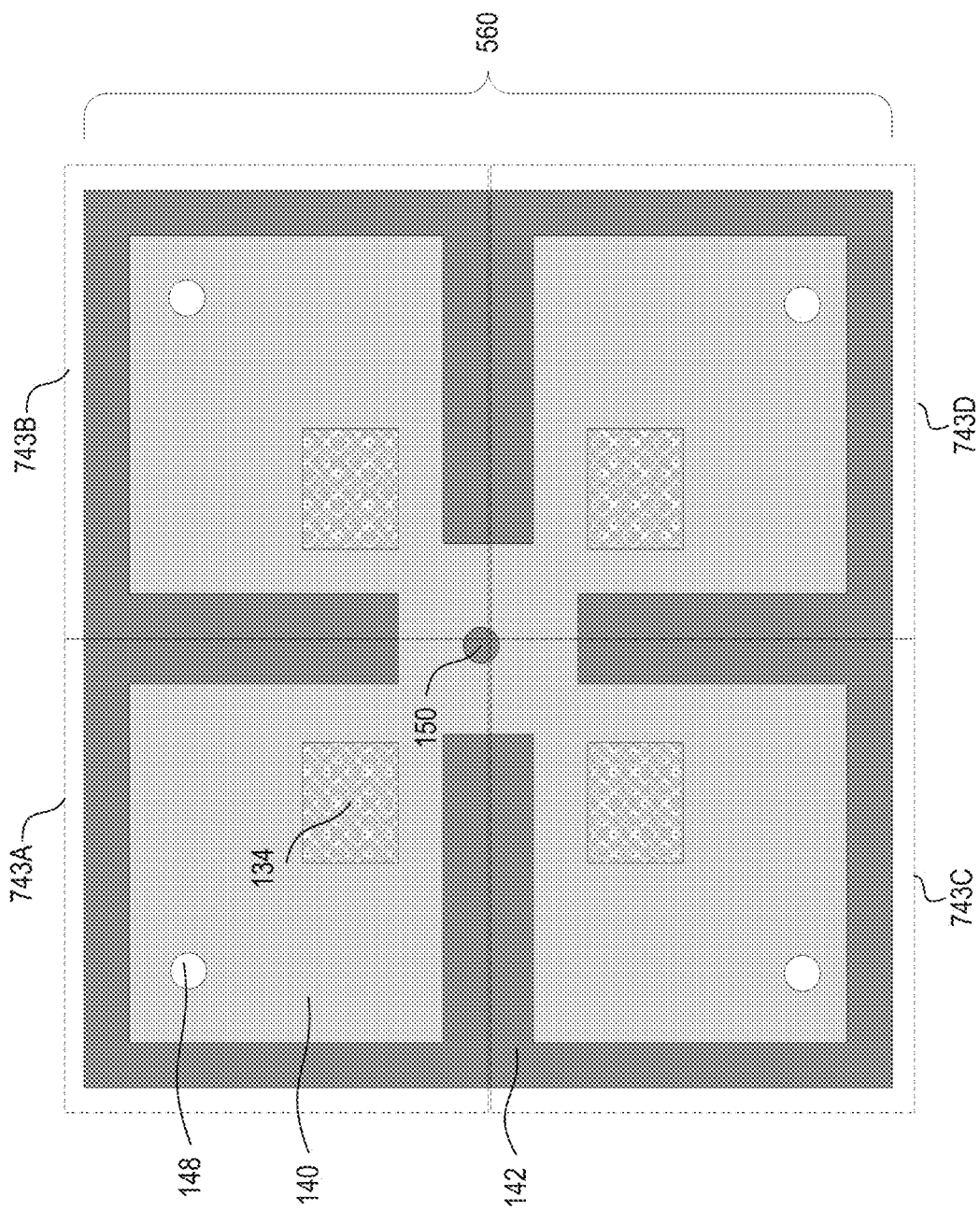
FIG. 7 illustrates a top view of a first chip of yet another three-chip CMOS image sensor, in accordance with some embodiments.

FIG. 7 illustrates a top view of a first chip of yet another three-chip CMOS image sensor, according to some embodiments. FIG. 7 illustrates four pixels 743A-743D disposed on first substrate 140. DTI structure 142 can form sections on first chip 560, and each section can include one image sensing element 138, one transfer transistor 134, and one diffusion well 136 or one floating node 148. The four pixels 743A-743D share one ground node 150 while each pixel has its own floating node 148. Because the number of ground nodes 150 is reduced, more space on first chip 560 can be used to form transfer transistor 134 with a greater size and the noise of transfer transistor 134 can be reduced. The four pixels 743A-743D can be isolated from each other by DTI structure 142. DTI structure 142 can extend from ground node 150 to the ends of the four pixels 743A-743D. DTI structure 142 can extend between adjacent pixels of the four pixels 743A-743D. Because DTI structure 142 is absent at the location of the shared ground node 150, more space on first chip 560 can be used to form DTI structure 142 to provide a greater separation between the pixels. Consequently, the light crosstalk and the electrical crosstalk between the pixels can be reduced. The discussion of second chip 270 in FIG. 2 applies to second chip 570 in FIG. 5. The discussion of third chip 280 in FIG. 2 applies to third chip 580 in FIG. 5.

Figure 8:
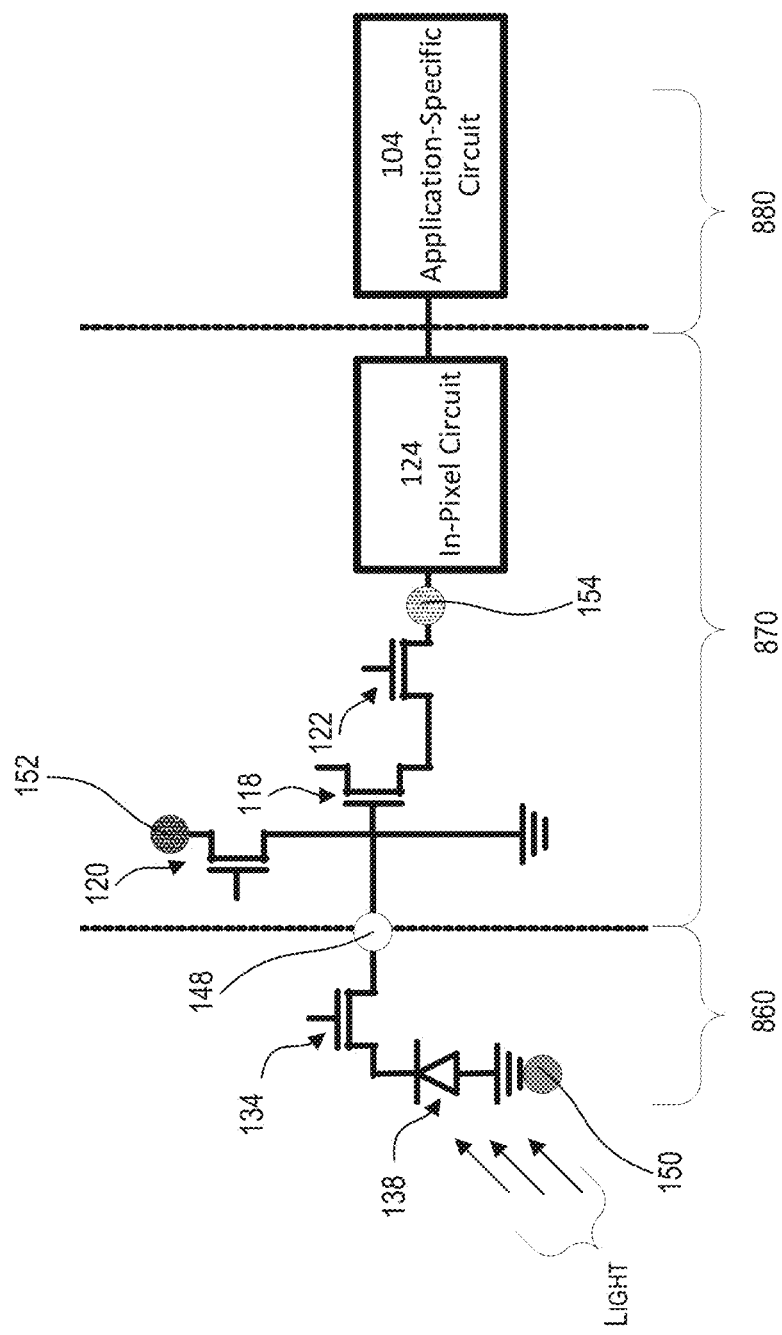
FIG. 8 is a circuit diagram of a three-chip CMOS image sensor, in accordance with some embodiments.

FIG. 8 is a circuit diagram of three-chip CMOS image sensors 200 and 500, according to some embodiments. FIG. 8 illustrates circuit nodes and circuit elements of a first chip 860, a second chip 870, and a third chip 880. First chip 860 is a schematic circuit representation of first chip 260 in FIG. 2 and first chip 560 in FIG. 5. Second chip 870 is a schematic circuit representation of second chip 270 in FIG. 2 and second chip 570 in FIG. 5. Third chip 880 is a schematic circuit representation of third chip 280 in FIG. 2 and third chip 580 in FIG. 5. On first chip 860, light can be sensed by photodiode 138. Photodiode 138 can be electrically coupled to ground node 150. Photodiode 138 can convert the sensed light into carriers, such as electron-hole pairs. Transfer transistor 134 can control whether the carriers can pass through to floating node 148. When transfer transistor 134 is on, the carriers can pass through to floating node 148. When transfer transistor 134 is off, the carriers cannot pass through to floating node 148.

On second chip 870, when floating node 148 is not floating or when diffusion well 136 is filled with carriers, source follower 118 can be turned on. Row select transistor 122 can control whether a particular source follower 118 from a row of source followers 118 can be selected to read its electrical signal. Row select transistor 122 can be electrically coupled to in-pixel circuit node 154. In-pixel circuit 124 can include a column amplifier, a CDS circuit, and combinations thereof. The column amplifier can provide extra gain and noise reduction, especially under low illumination conditions. The CDS circuit can eliminate the fixed-pattern noise due to pixel mismatch. After the signal of source follower 118 is read or ignored, reset transistor 120 can reset floating node 148 by releasing the carriers into the ground. Reset transistor can be electrically coupled to Vdd node 152.

On third chip 880, application-specific circuit 104 can be electrically coupled to in-pixel circuit 124. Application-specific circuit 104 can include an ADC, a counter, a memory storage device, and combinations thereof. The ADC can convert an analog voltage into a digital signal. The counter can provide a clocking signal. The memory storage device can store the digital signal and the clocking signal. Three-chip CMOS image sensors 200 and 500 can be used in either a rolling shutter configuration or a global shutter configuration. A rolling shutter configuration only has a row select function to select from a row of pixels. A global shutter configuration has both a row select function and a column select function to select from a matrix of pixels.

Figure 9:
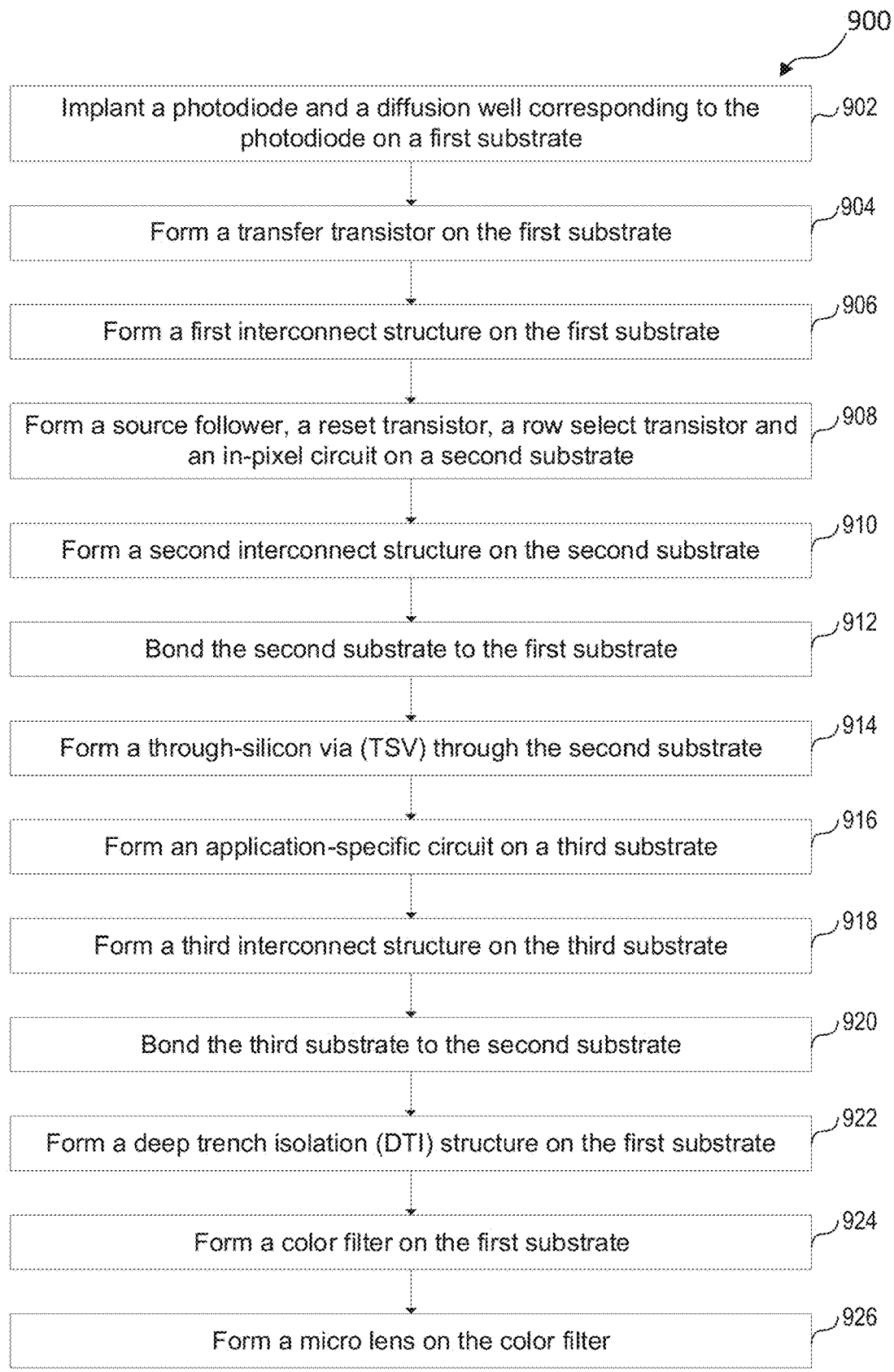
FIG. 9 is a flow diagram of a method for fabricating a three-chip CMOS image sensor, in accordance with some embodiments.

FIG. 9 is a flow diagram of a method 900 for fabricating three-chip CMOS image sensor 200 as shown in FIG. 2, according to some embodiments. For illustrative purposes, the operations illustrated in FIG. 9 will be described with reference to the example fabrication process for fabricating three-chip CMOS image sensor 200 as illustrated in FIGS. 10-22. FIGS. 10-22 are cross-sectional views of three-chip CMOS image sensor 200 at various stages of fabrication, according to some embodiments. Additional fabrication operations can be performed between the various operations of method 900 and are omitted for simplicity. These additional fabrication operations are within the spirit and the scope of this disclosure. Moreover, not all operations may be required to perform the disclosure provided herein. Additionally, some of the operations can be performed simultaneously or in a different order than the ones shown in FIG. 9. Elements in FIGS. 10-22 with the same annotations as the elements in FIG. 2 are described above. It should be noted that method 900 may not produce a complete three-chip CMOS image sensor 200. Accordingly, it is understood that additional processes can be provided before, during, and after method 900, and that some other processes may only be briefly described herein.

Figure 10:
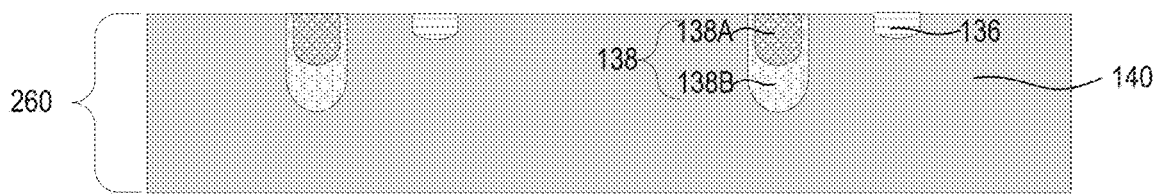

Referring to FIG. 9, in operation 902, a photodiode and a diffusion well corresponding to the photodiode are implanted in a first substrate. For example, as shown in FIG. 10, photodiode 138 and diffusion well 136 can be implanted in first substrate 140. Diffusion well 136 and second doped region 138B of photodiode 138 can be implanted in first substrate 140. First doped region 138A of photodiode 138 can be implanted in second doped region 138B. The implantation dopant species can be an n-type dopant, such as P and As, a p-type dopant, such as B, In, Al, Ga, and combinations thereof. The ion beam energy can be between about 0.5 keV and about 15 keV. The dose of the dopants can be between about $0.5 \times 10^{15}$ ions/cm$^2$ and about $1.5 \times 10^{16}$ ions/cm$^2$. The tilt angle for the ion beam can be between about 0° and about 30°. The twist angle for the ion beam can be flexible. In some embodiments, a post-implantation anneal can be performed.

Figure 11:
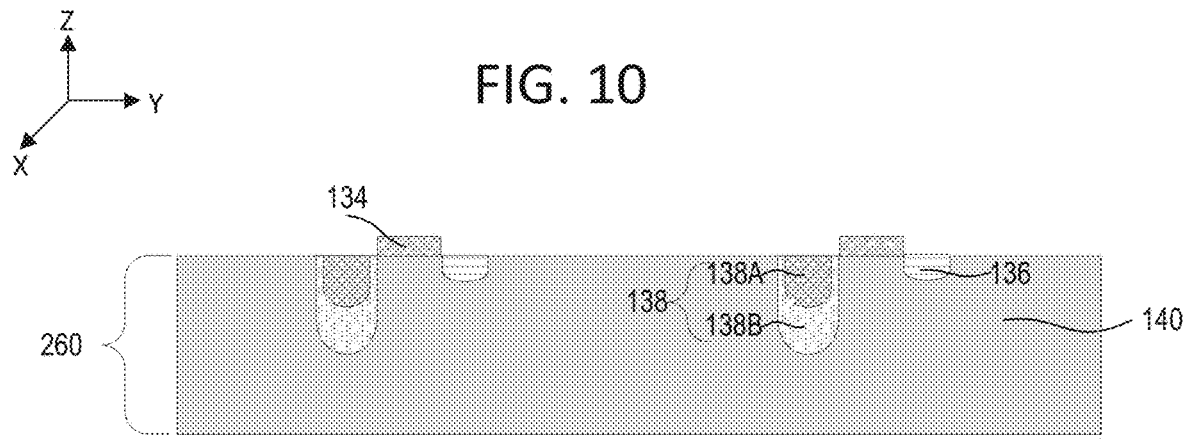

Referring to FIG. 9, in operation 904, a transfer transistor is formed on the first substrate. For example, as shown in FIG. 11, transfer transistor 134 can be formed on first substrate 140 and adjacent to diffusion well 136 and photodiode 138. The area to form transfer transistor 134 can be patterned by a photolithography process. In some embodiments, an IO layer (not shown in FIG. 11) of transfer transistor 134 can be formed by a chemical vapor deposition (CVD) process or a physical vapor deposition (PVD) process. A HK dielectric layer (not shown in FIG. 11) of transfer transistor 134 can be deposited by a CVD process or a PVD process. A WFM layer (not shown in FIG. 11) of transfer transistor 134 can be deposited by a CVD process, a PVD process, or a metal-organic chemical vapor deposition (MOCVD) process. A metal fill layer (not shown in FIG. 11) of transfer transistor 134 can be deposited by a CVD process, a PVD process, or a MOCVD process.

Figure 12:
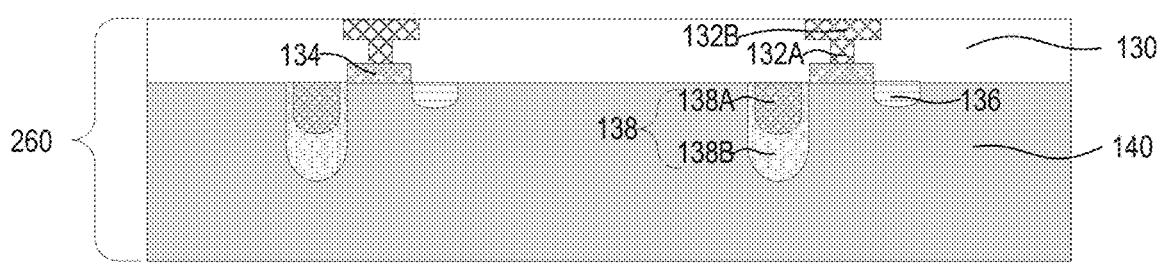

Referring to FIG. 9, in operation 906, a first interconnect structure is formed on the first substrate. For example, as shown in FIG. 12, a first interconnect structure including metal vias 132A and metal lines 132B can be formed on first substrate 140. First ILD layer 130 can be deposited on first substrate 140 by a CVD process and polished by a chemical-mechanical planarization (CMP) process. Metal via openings and metal line openings can be formed in first ILD layer 130 and on transfer transistor 134 by a dry etch process (e.g., reactive ion etch process) using a fluorocarbon ($C_xF_y$) gas. Metal vias 132A and metal lines 132B can be deposited in the metal via openings and metal line openings by a sputtering process, an electroplating process, a PVD process, a CVD process, a plasma-enhanced chemical vapor deposition (PECVD) process, or a MOCVD process. In some embodiments, barrier layers (not shown in FIG. 12) can be deposited by a CVD process or an atomic layer deposition (ALD) process before metal vias 132A and metal lines 132B are formed.

Referring to FIG. 9, in operation 908, a source follower, a reset transistor, a row select transistor, and an in-pixel circuit are formed on a second substrate. For example, as shown in FIG. 13, source follower 118, reset transistor 120, row select transistor 122, and in-pixel circuit 124 can be formed on second substrate 116. S/D regions (not shown in FIG. 13) can be implanted in second substrate 116 adjacent to source follower 118, reset transistor 120, row select transistor 122, and in-pixel circuit 124 in a manner similar to that described with reference to FIG. 10 and operation 902 of FIG. 9. Different layers of source follower 118, reset transistor 120, row select transistor 122, and in-pixel circuit 124 can be deposited in a manner similar to that described with reference to FIG. 11 and operation 904 of FIG. 9. In some embodiments, in-pixel circuit 124 can include circuit elements other than a transistor. In some embodiments, operation 908 can further include processes to form such circuit elements.

Referring to FIG. 9, in operation 910, a second interconnect structure is formed on the second substrate. For example, as shown in FIG. 14, a second interconnect structure including metal vias 128A and metal lines 128B and 114 can be formed on second substrate 116. Second ILD layer 126 can be deposited on second substrate 116 and metal vias 128A and metal lines 128B and 114 can be formed in a manner similar to that described with reference to FIG. 12 and operation 906 of FIG. 9.

Figure 15:
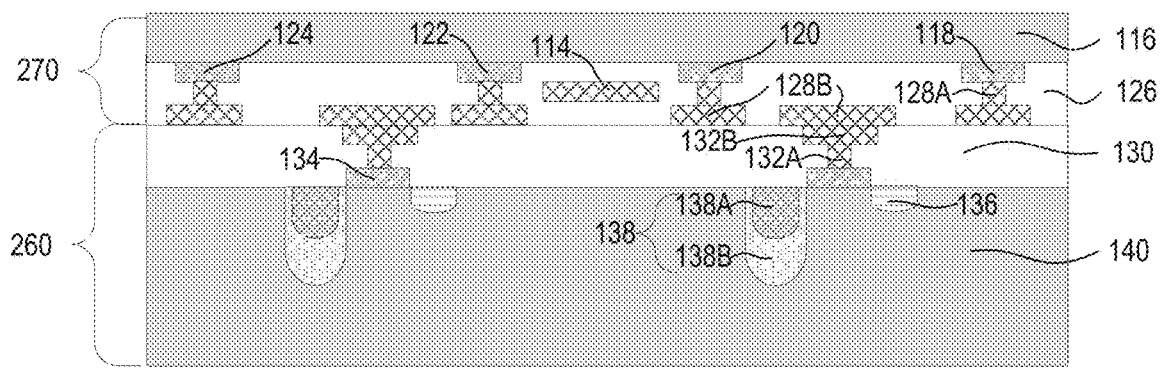

Referring to FIG. 9, in operation 912, the second substrate is bonded to the first substrate. For example, as shown in FIG. 15, second chip 270 can be bonded to first chip 260. Second chip 270 can be flipped over and bonded to first chip 260 by a fusion bonding process, a hybrid bonding process, an anodic bonding process, a direct bonding process, or other suitable bonding processes. Portions of the first interconnect structure and portions of the second interconnect structure can be in contact to electrically couple first chip 260 to second chip 270. In some embodiments, second substrate 116 can be thinned by a CMP process after bonding.

Figure 16:
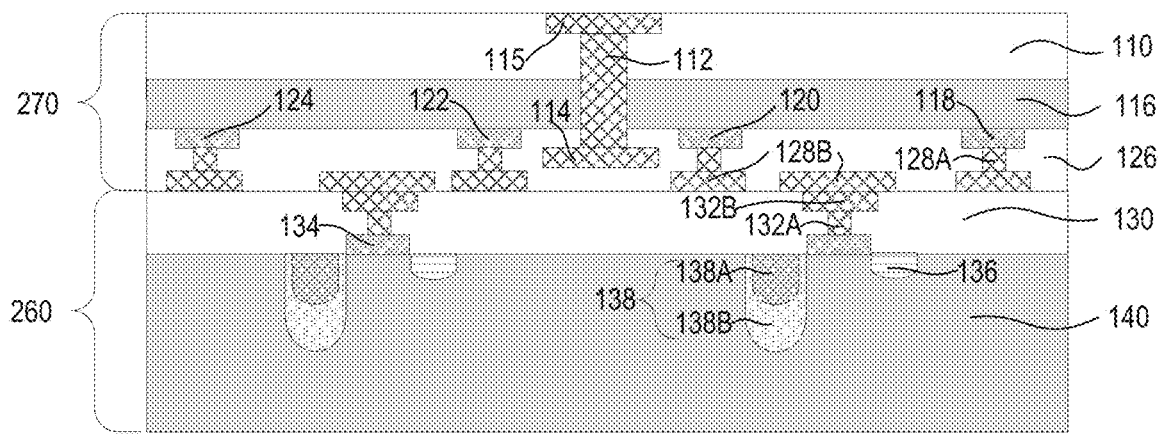

Referring to FIG. 9, in operation 914, a TSV is formed through the second substrate. For example, as shown in FIG. 16, TSV 112 can be formed through second substrate 116. Third ILD layer 110 can be deposited on second substrate 116 by a CVD process and polished by a CMP process. A TSV opening can be formed in third ILD layer 110, through second substrate 116, and on metal line 114 by a dry etch process. A metal line opening can be formed in third ILD layer 110 and on the TSV opening. Metal line 115 and TSV 112 can be deposited in the metal line opening and the TSV opening in a manner similar to that described with reference to FIG. 12 and operation 906 of FIG. 9. In some embodiments, a TSV barrier layer (not shown in FIG. 16) can be deposited by a CVD process or an ALD process before TSV 112 is formed. In some embodiments, a barrier layer (not shown in FIG. 16) can be deposited by a CVD process or an ALD process before metal line 115 is formed.

Figure 17:

Referring to FIG. 9, in operation 916, an application-specific circuit is formed on a third substrate. For example, as shown in FIG. 17, application-specific circuit 104 can be formed on third substrate 102. S/D regions (not shown in FIG. 17) can be implanted in third substrate 102 adjacent to application-specific circuit 104 in a manner similar to that described with reference to FIG. 10 and operation 902 of FIG. 9. Different layers of application-specific circuit 104 can be deposited in a manner similar to that described with reference to FIG. 11 and operation 904 of FIG. 9. In some embodiments, application-specific circuit 104 can include circuit elements other than a transistor. In some embodiments, operation 916 can further include processes to form such circuit elements.

Figure 18:
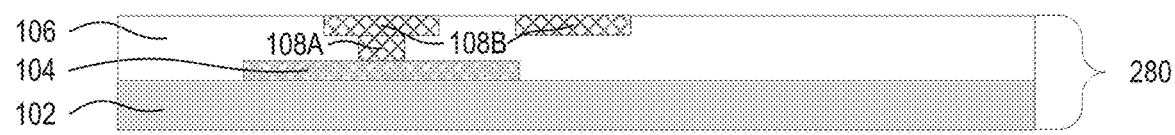

Referring to FIG. 9, in operation 918, a third interconnect structure is formed on the third substrate. For example, as shown in FIG. 18, a third interconnect structure including metal vias 108A and metal lines 108B can be formed on third substrate 102. Fourth ILD layer 106 can be deposited on third substrate 102 and metal vias 108A and metal lines 108B can be formed in a manner similar to that described with reference to FIG. 12 and operation 906 of FIG. 9.

Figure 19:
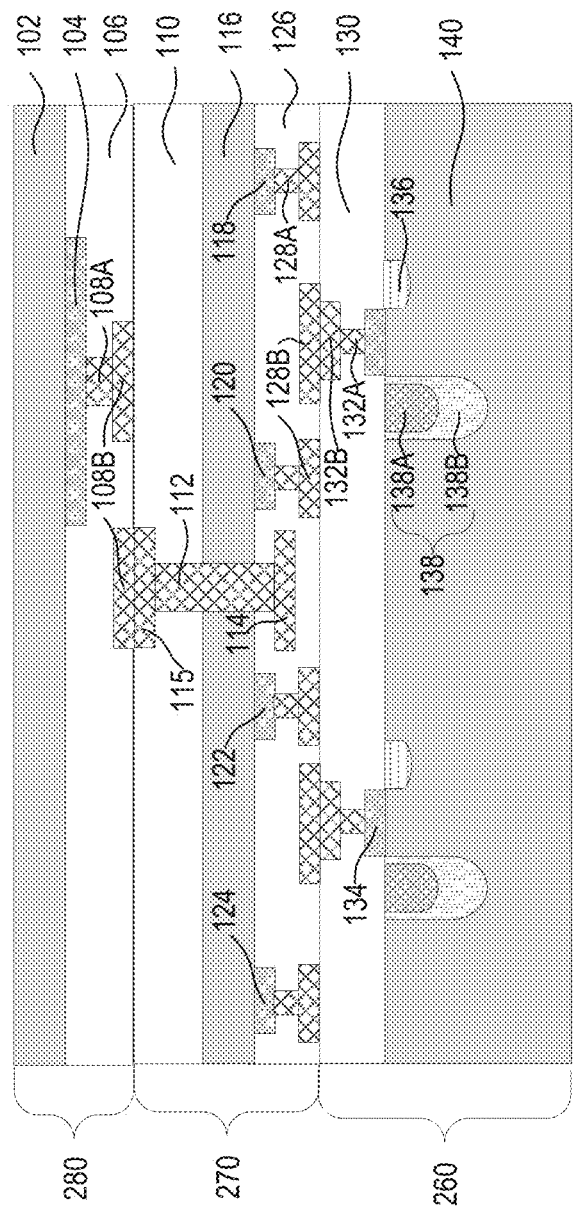
Figure 20:
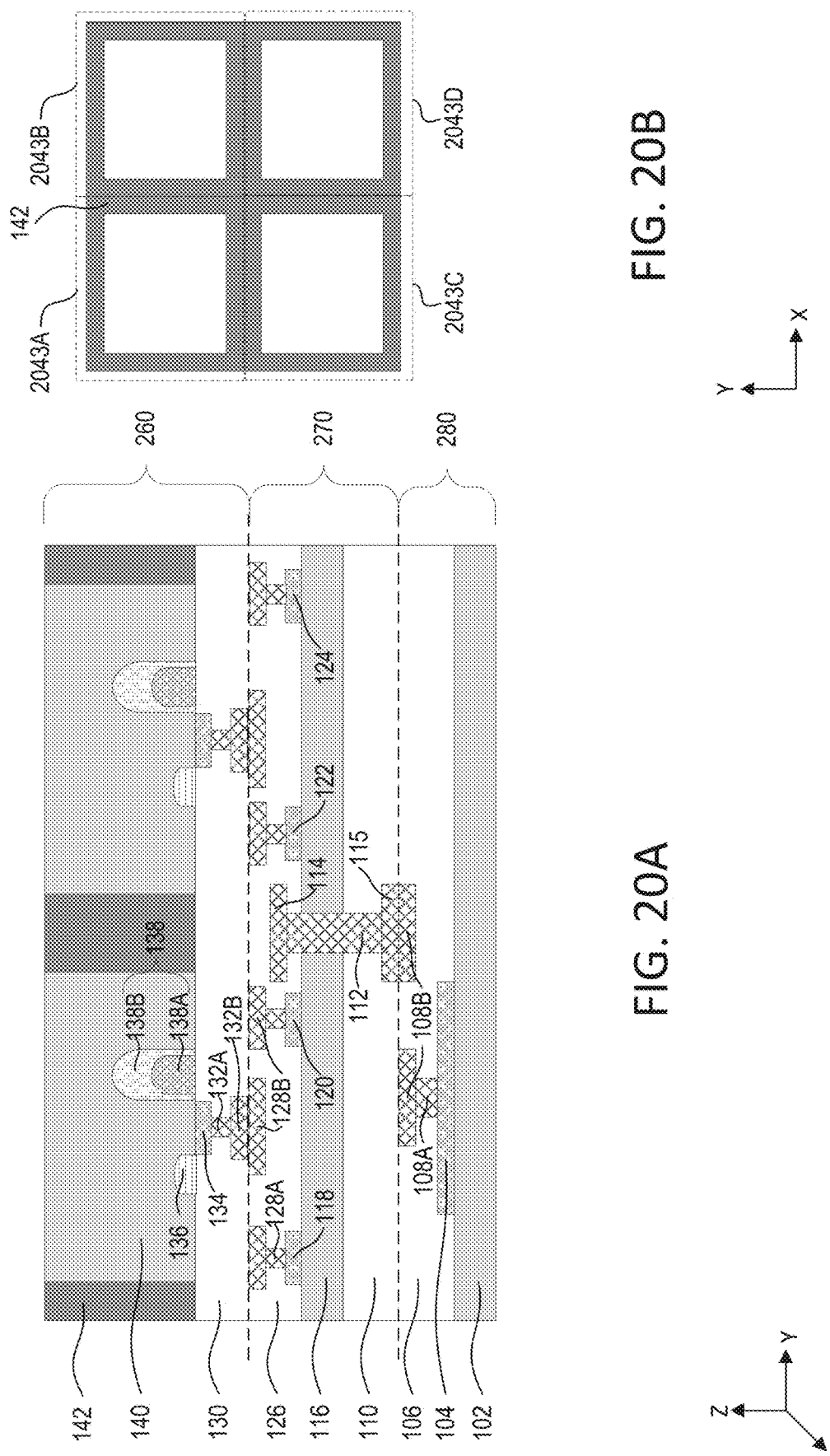

Referring to FIG. 9, in operation 920, the third substrate is bonded to the second substrate. For example, as shown in FIG. 19, third chip 280 can be bonded to second chip 270. Third chip 280 can be flipped over and bonded to second chip 270 in a manner similar to that described with reference to FIG. 15 and operation 912 of FIG. 9. Portions of the third interconnect structure and portions of metal line 115 can be in contact to electrically couple third chip 280 to second chip 270.

Referring to FIG. 9, in operation 922, a DTI structure is formed on the first substrate. For example, as shown in FIG. 20A, DTI structure 142 can be formed on first substrate 140. In operation 922, three-chip CMOS image sensor 200 is flipped over to continue the backside processes. DTI openings can be formed in first substrate 140 by a dry etch process (e.g., reactive ion etch process) using $C_xF_y$. In some embodiments, the DTI openings can be formed by a wet etch process using hydrogen peroxide at a temperature ranging from about 30° C. to about 100° C. In some embodiments, the wet etch process can include a diluted solution of hydrogen fluoride (HF) with a buffer, such as ammonium fluoride ($NH_4F$), diluted HF ($HF/H_2O$), phosphoric acid ($H_3PO_4$), sulfuric acid with deionized water ($H_2SO_4/H_2O$), and combinations thereof. The etch process can be a timed etch. DTI structure 142 can be deposited in the DTI openings by a CVD process and polished by a CMP process. In some embodiments, DTI structure 142 and first substrate 140 can be thinned by a CMP process. DTI structure 142 can be formed to separate an array of pixels 2043A-2043D as shown in FIG. 20B.

Figure 21:
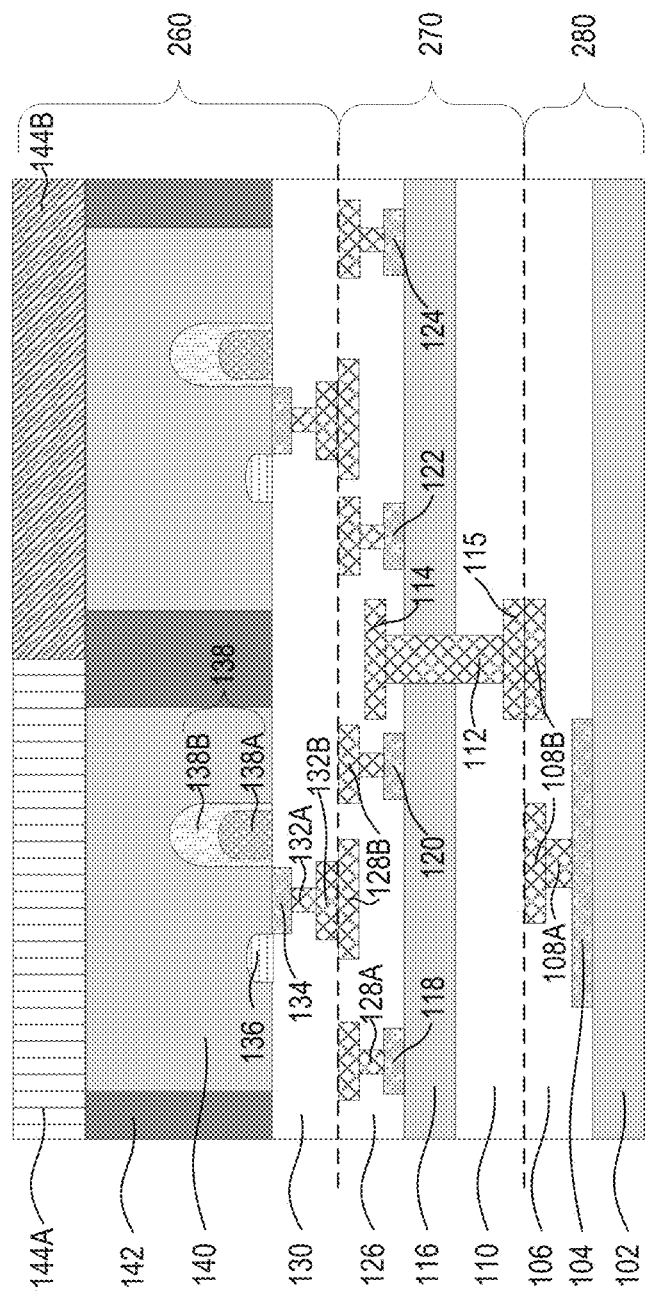

Referring to FIG. 9, in operation 924, color filters are formed on the first substrate. For example, as shown in FIG. 21, color filters 144A and 144B can be formed on first substrate 140. A color filter layer, such as a color photoresist, can be spin-coated on substrate 140 and DTI structure 142. The color photoresist can be patterned by a photolithography process. The color photoresist can be exposed to an ultraviolet (UV) or an extreme ultraviolet (EUV) light source through a photomask, such as a reticle. The exposed color photoresist can be developed by a developer chemical. In some embodiments, the developed color photoresist can be baked to improve the durability of color filters 144A and 144B. Color filters 144A and 144B can be formed as an array on the array of pixels.

Figure 22:
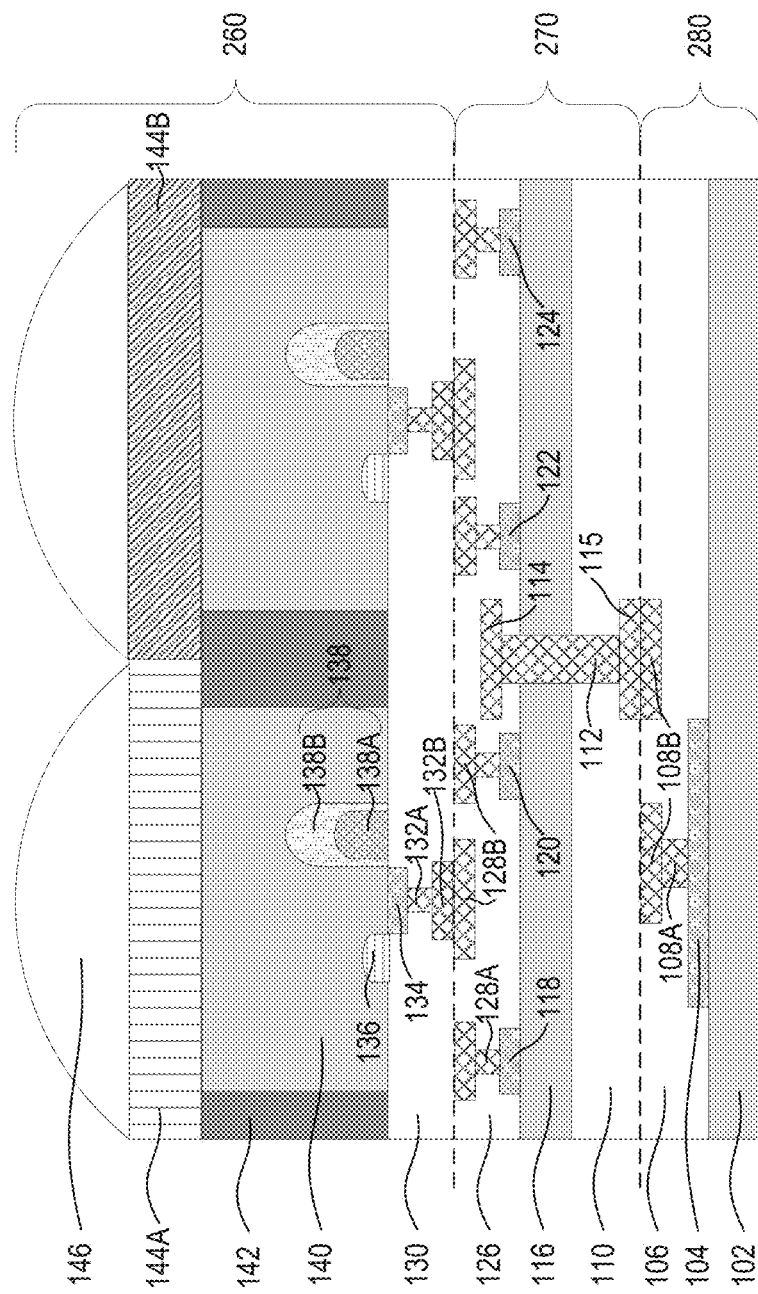

Referring to FIG. 9, in operation 926, micro lenses are formed on the color filters. For example, as shown in FIG. 22, micro lenses 146 can be formed on color filters 144A and 144B. A micro lens layer, such as an acrylic-based photoresist, a polyimide photoresist, an epoxy photoresist, polyorganosiloxane, and polyorganosilicate, can be spin-coated on color filters 144A and 144B. The micro lens layer can be patterned by a photolithography process. The micro lens layer can be exposed to an ultraviolet (UV) or an extreme ultraviolet (EUV) light source through a photomask, such as a reticle. The intensity of the UV or EUV light source can vary across each micro lens. For example, for a negative photoresist, more light can be exposed near the side of the micro lens and less light can be exposed near the center of the micro lens. The varying intensity of the light source can form the micro lens with a curved upper surface. The exposed micro lens layer can be developed by a developer chemical. In some embodiments, the developed micro lens layer can be baked to improve the durability of micro lenses 146. Micro lenses 146 can be formed as an array on the array of pixels.

Figure 23:
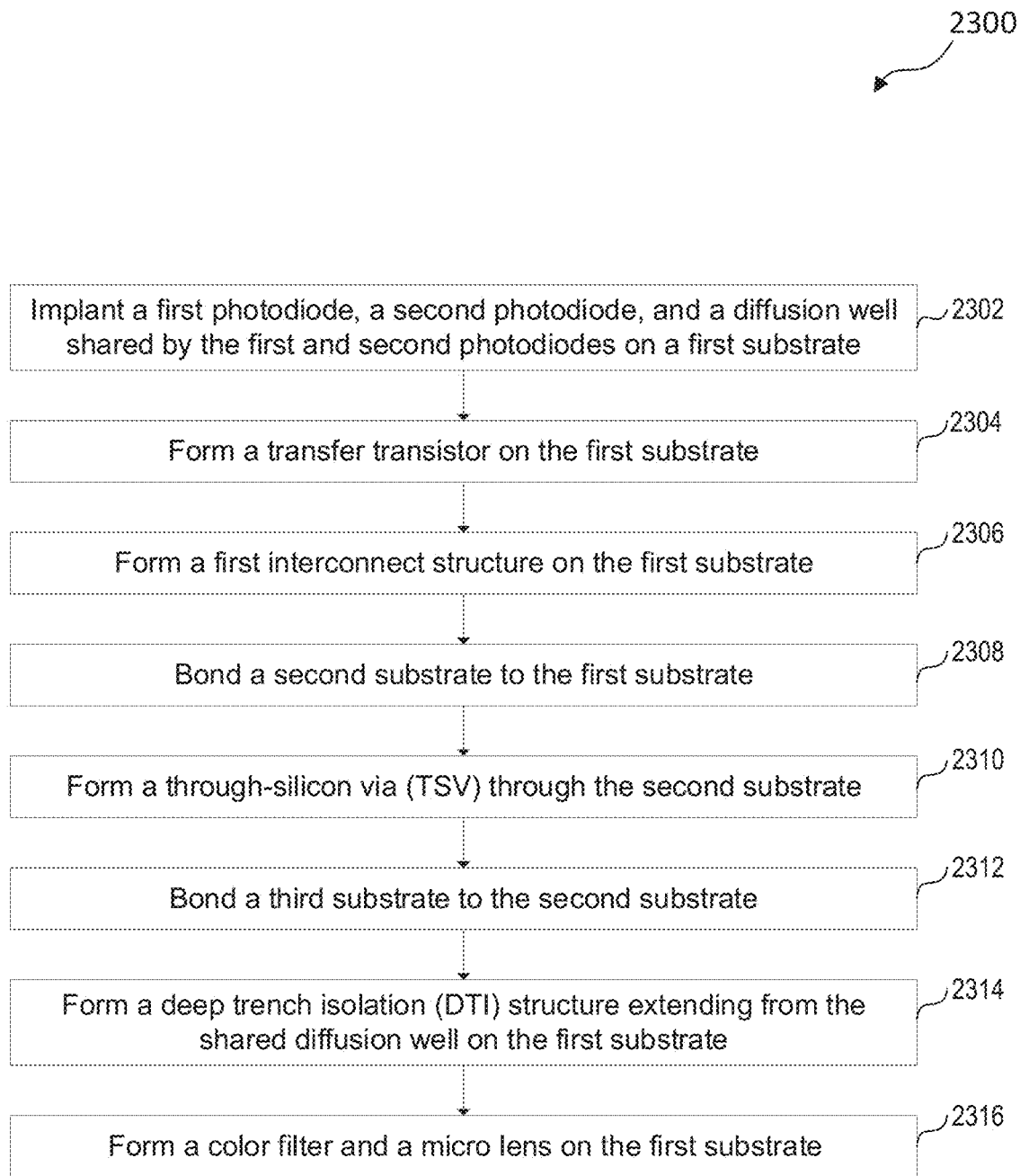
FIG. 23 is a flow diagram of another method for fabricating a three-chip CMOS image sensor, in accordance with some embodiments.

FIG. 23 is a flow diagram of a method 2300 for fabricating three-chip CMOS image sensor 500 as shown in FIG. 5, according to some embodiments. For illustrative purposes, the operations illustrated in FIG. 23 will be described with reference to the example fabrication process for fabricating three-chip CMOS image sensor 500 as illustrated in FIGS. 24-31. FIGS. 24-31 are cross-sectional views of three-chip CMOS image sensor 500 at various stages of fabrication, according to some embodiments. Additional fabrication operations can be performed between the various operations of method 2300 and are omitted for simplicity. These additional fabrication operations are within the spirit and the scope of this disclosure. Moreover, not all operations may be required to perform the disclosure provided herein. Additionally, some of the operations can be performed simultaneously or in a different order than the ones shown in FIG. 23. Elements in FIGS. 24-31 with the same annotations as the elements in FIG. 5 are described above. It should be noted that method 2300 may not produce a complete three-chip CMOS image sensor 500. Accordingly, it is understood that additional processes can be provided before, during, and after method 2300, and that some other processes may only be briefly described herein.

Figure 24:
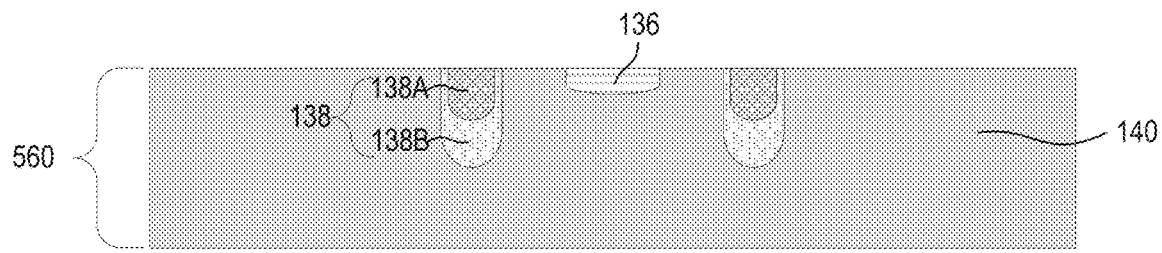
FIGS. 24-31 illustrate cross-sectional views of another three-chip CMOS image sensor at various stages of its fabrication process, in accordance with some embodiments.

Referring to FIG. 23, in operation 2302, a first photodiode, a second photodiode, and a diffusion well shared by the first and second photodiodes are implanted in a first substrate. For example, as shown in FIG. 24, two or more photodiodes 138 and one diffusion well 136 to be shared by the two or more photodiodes 138 can be implanted in first substrate 140. The two or more photodiodes 138 and diffusion well 136 can be implanted in a manner similar to that described with reference to FIG. 10 and operation 902 of FIG. 9.

Figure 25:
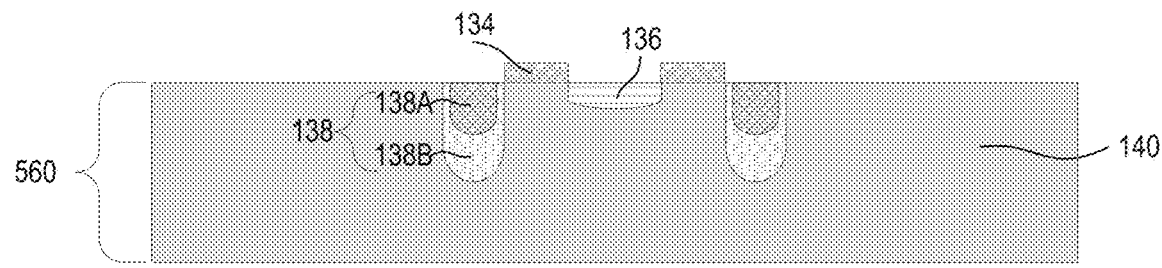

Referring to FIG. 23, in operation 2304, a transfer transistor is formed on the first substrate. For example, as shown in FIG. 25, two or more transfer transistors 134 can be formed on first substrate 140 to connect the two or more photodiodes 138 to the shared diffusion well 136. The two or more transfer transistors 134 can be formed in a manner similar to that described with reference to FIG. 11 and operation 904 of FIG. 9.

Figure 26:
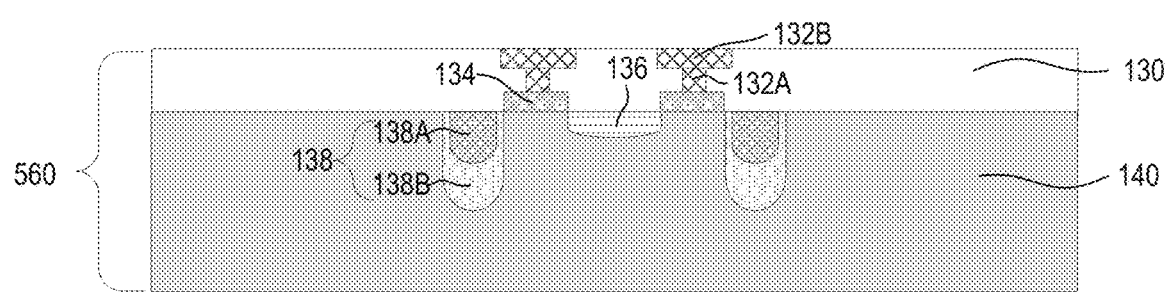

Referring to FIG. 23, in operation 2306, a first interconnect structure is formed on the first substrate. For example, as shown in FIG. 26, a first interconnect structure including metal vias 132A and metal lines 132B can be formed on first substrate 140. The first interconnect structure can be formed in a manner similar to that described with reference to FIG. 12 and operation 906 of FIG. 9.

Figure 27:
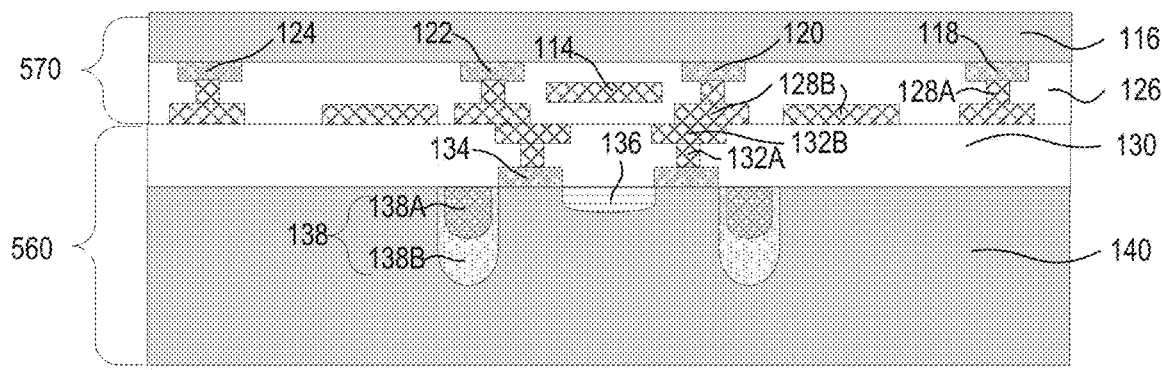

Referring to FIG. 23, in operation 2308, a second substrate is bonded to the first substrate. For example, as shown in FIG. 27, second chip 570 can be bonded to first chip 560. Second chip 570 can include source follower 118, reset transistor 120, row select transistor 122, and in-pixel circuit 124. Source follower 118, reset transistor 120, row select transistor 122, and in-pixel circuit 124 can be formed on second substrate 116 in a manner similar to that described with reference to FIG. 13 and operation 908 of FIG. 9. Second chip 570 can include a second interconnect structure including metal vias 128A and metal lines 128B and 114. The second interconnect structure can be formed on second substrate 116 in a manner similar to that described with reference to FIG. 12 and operation 906 of FIG. 9. Second chip 570 can be bonded to first chip 560 in a manner similar to that described with reference to FIG. 15 and operation 912 of FIG. 9.

Figure 28:
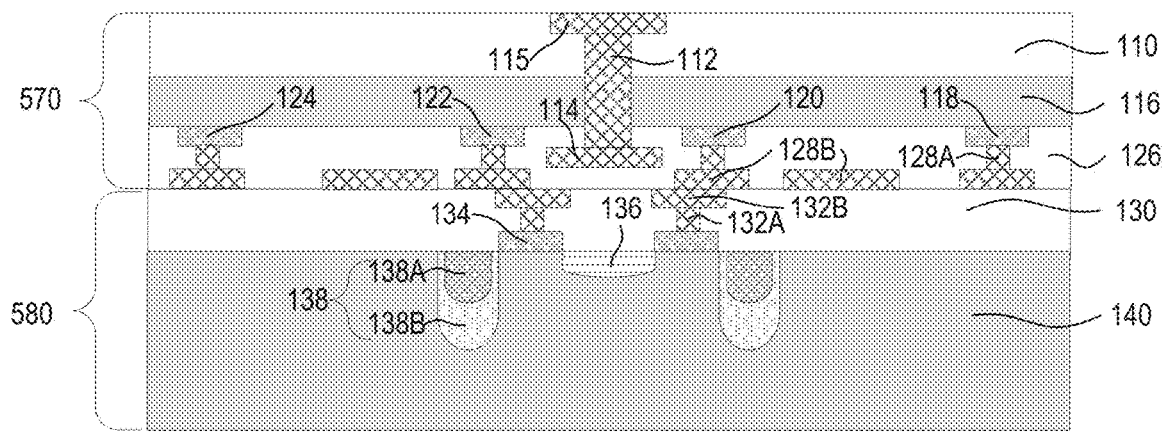

Referring to FIG. 23, in operation 2310, a TSV is formed through the second substrate. For example, as shown in FIG. 28, TSV 112 can be formed through second substrate 116 and metal line 115 can be formed on TSV 112. TSV 112 and metal line 115 can be formed in a manner similar to that described with reference to FIG. 16 and operation 914 of FIG. 9.

Figure 29:
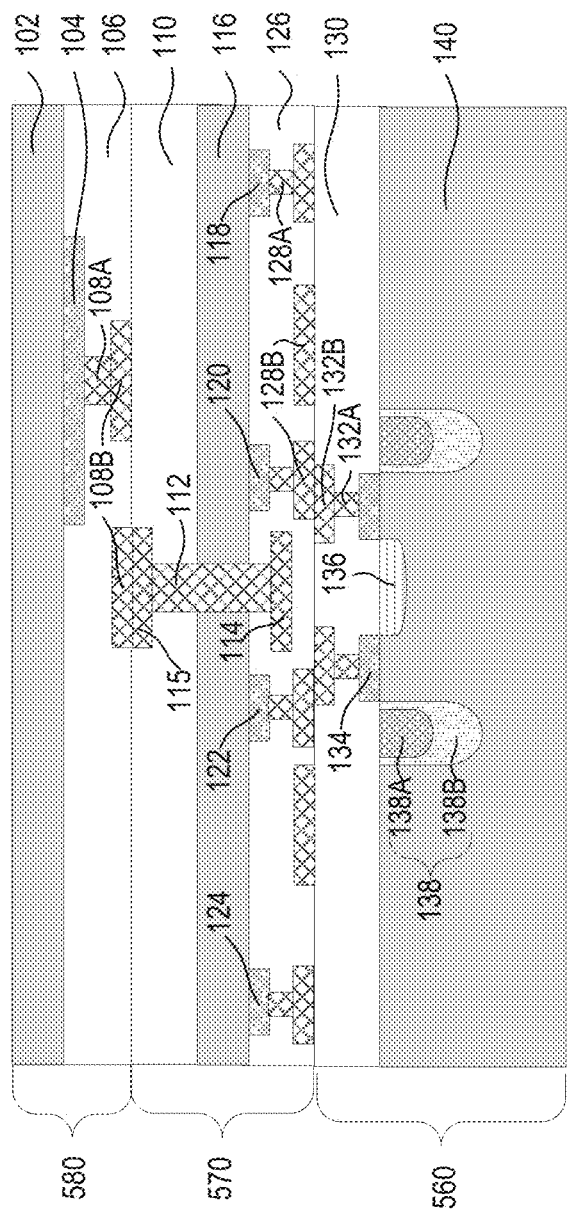

Referring to FIG. 23, in operation 2312, a third substrate is bonded to the second substrate. For example, as shown in FIG. 29, third chip 580 can be bonded to second chip 570. Third chip 580 can include application-specific circuit 104. Application-specific circuit 104 can be formed on third substrate 102 in a manner similar to that described with reference to FIG. 17 and operation 916 of FIG. 9. Third chip 580 can include a third interconnect structure including metal vias 108A and metal lines 108B. The third interconnect structure can be formed on third substrate 102 in a manner similar to that described with reference to FIG. 12 and operation 906 of FIG. 9. Third chip 580 can be bonded to second chip 570 in a manner similar to that described with reference to FIG. 15 and operation 912 of FIG. 9.

Figure 30A:
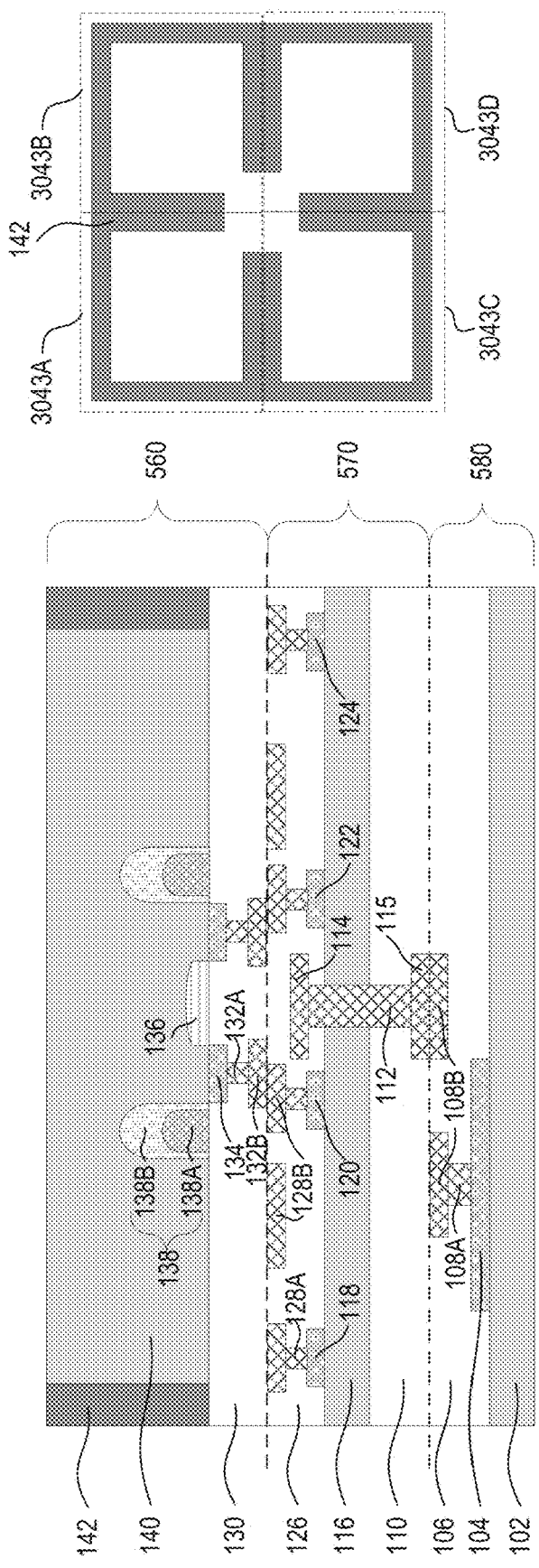
Figure 30B:
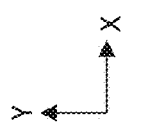

Referring to FIG. 23, in operation 2314, a DTI structure extending from the shared diffusion well is formed on the first substrate. For example, as shown in FIG. 30A, DTI structure 142 can be formed on first substrate 140. DTI structure 142 can be formed in a manner similar to that described with reference to FIG. 20A and operation 922 of FIG. 9. Because the shared diffusion well 136 is at a center of an array of pixels 3043A-3043D, DTI structure 142 can be formed to extend from the shared diffusion well 136 to the ends of the array of pixels 3043A-3043D as shown in FIG. 30B.

Figure 31:
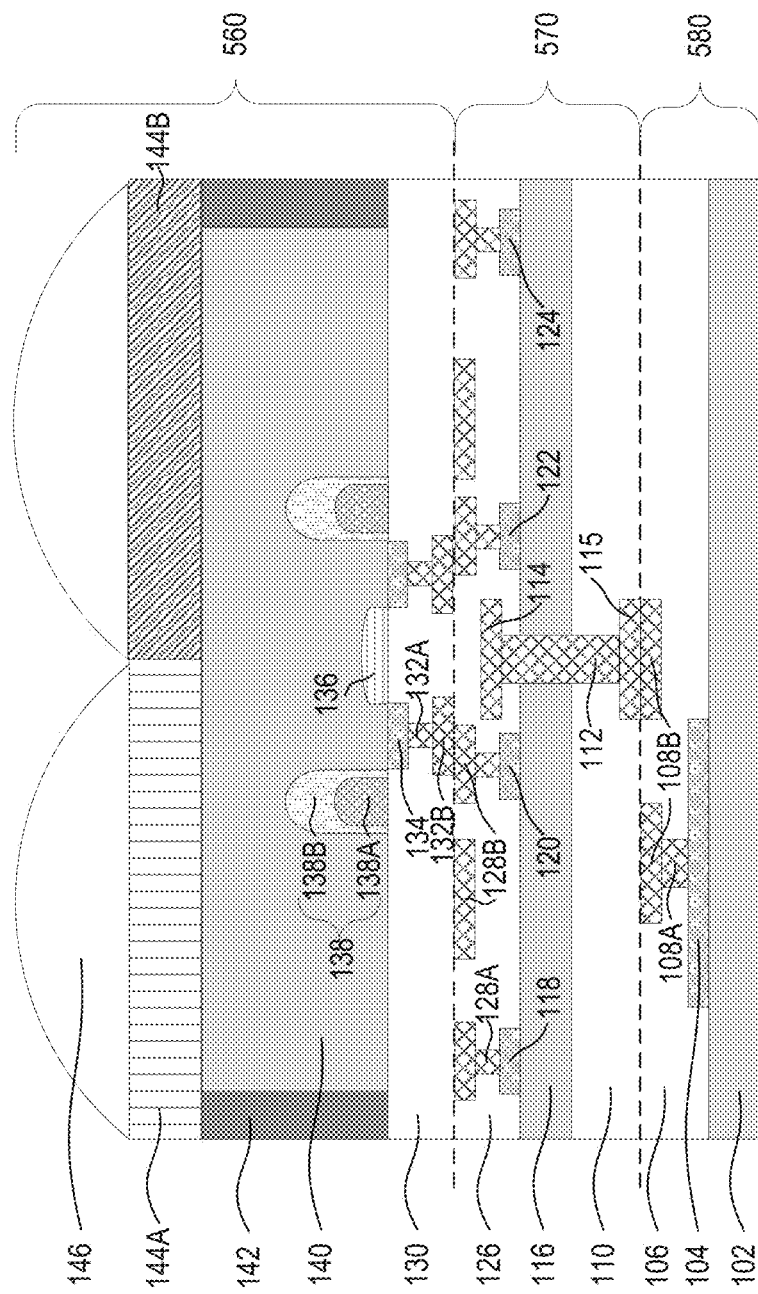

Referring to FIG. 23, in operation 2316, color filters and micro lenses are formed on the first substrate. For example, as shown in FIG. 31, color filters 144A and 144B can be formed on first substrate 140 and micro lenses 146 can be formed on color filters 144A and 144B. Color filters 144A and 144B can be formed in a manner similar to that described with reference to FIG. 21 and operation 924 of FIG. 9. Micro lenses 146 can be formed in a manner similar to that described with reference to FIG. 22 and operation 926 of FIG. 9.

The present disclosure provides example three-chip CMOS image sensors (e.g., three-chip CMOS image sensors 200 and 500) and example methods (e.g., methods 900 and 2300) for fabricating the same. In the three-chip design of CMOS image sensors, the pixels (e.g., photodiode 138), the transfer transistors (e.g., transfer transistor 134), and the diffusion wells (e.g., diffusion well 136) can be formed on a first chip (e.g., first chips 260 and 560). The source followers (e.g., source follower 118), the reset transistors (e.g., reset transistor 120), the row select transistors (e.g., row select transistor 122), and the in-pixel circuits (e.g., in-pixel circuit 124) can be formed on a second chip (e.g., second chips 270 and 570). The application-specific circuits (e.g., application-specific circuit 104) can be formed on a third chip (e.g., third chips 280 and 580). The second chip can be bonded to the first chip. The third chip can be bonded to the second chip. Each of the three chips can include interconnect structures, such as metal vias (e.g., metal vias 132A, 128A, and 108A), metal lines (e.g., metal lines 132B, 128B, 114, 115, and 108B), and TSVs (e.g., TSV 112). The interconnect structures can electrically couple the three chips to one another. The first chip can further include DTI structures (e.g., DTI structure 142), color filters (e.g., color filters 144A and 144B), and micro lenses (e.g., micro lenses 146). Compared to two-chip CMOS image sensors, the three-chip CMOS image sensors have an additional chip to house the source followers, the reset transistors, and the row select transistors. Therefore, the sizes of these transistors can be increased. The sizes of the transfer transistors on the first chip can also be increased as a result of the source followers, the reset transistors, and the row select transistors being placed on the second chip. The increased sizes of these transistors can reduce the noise of these transistors. As a result of the source followers, the reset transistors, and the row select transistors being placed on the second chip, there can be more chip space on the first chip for the DTI structures. DTI structures with greater widths can reduce the light crosstalk between the pixels and the electrical crosstalk between the transistors. Both the decreased noise and the decreased crosstalk in the three-chip CMOS image sensors can improve device performance.

In some embodiments, several pixels can share one diffusion well or one ground node (e.g., ground node 150) on the first chip, and the DTI structures can extend from the shared diffusion well or the shared ground node to the ends of the pixels. By sharing the diffusion well or the ground node, more chip space can be available for fabricating the DTI structures. The DTI structures can have increased widths and achieve greater isolation between the pixels. This can further decrease the crosstalk in the three-chip CMOS image sensors and improve device performance.

In some embodiments, an image sensor includes a first chip including a plurality of image sensing elements, transfer transistors and diffusion wells corresponding to the plurality of image sensing elements, a ground node shared by the plurality of image sensing elements, and deep trench isolation (DTI) structures extending from the shared ground node and between adjacent image sensing elements of the plurality of image sensing elements. The image sensor further includes a second chip bonded to the first chip and including a source follower, a reset transistor, a row select transistor, and an in-pixel circuit, where the source follower is electrically coupled to the diffusion wells. The image sensor further includes a third chip bonded to the second chip and including an application-specific circuit, where the application-specific circuit is electrically coupled to the in-pixel circuit.

In some embodiments, an image sensor includes a first chip including a first image sensing element and a second image sensing element, a first transfer transistor and a second transfer transistor, a diffusion well shared by the first and second image sensing elements, and a deep trench isolation (DTI) structure extending from the diffusion well and between the first and second image sensing elements. The image sensor further includes a second chip bonded to the first chip and including a source follower, a reset transistor, a row select transistor, and an in-pixel circuit, where the source follower is electrically coupled to the diffusion well. The image sensor further includes a third chip bonded to the second chip and including an application-specific circuit, where the application-specific circuit is electrically coupled to the in-pixel circuit.

In some embodiments, a method includes forming an image sensing element, a transfer transistor, a diffusion well, and a first interconnect structure on a first chip, forming a source follower, a reset transistor, a row select transistor, an in-pixel circuit, and a second interconnect structure on a second chip, and bonding the first and second chips to electrically couple the first and second interconnect structures. The method further includes forming an application-specific circuit and a third interconnect structure on a third chip and bonding the second and third chips to electrically couple the second and third interconnect structures.

It is to be appreciated that the Detailed Description section, and not the Abstract of the Disclosure section, is intended to be used to interpret the claims. The Abstract of the Disclosure section may set forth one or more but not all possible embodiments of the present disclosure as contemplated by the inventor(s), and thus, are not intended to limit the subjoined claims in any way.

The foregoing disclosure outlines features of several embodiments so that those skilled in the art may better understand the aspects of the present disclosure. Those skilled in the art will appreciate that they may readily use the present disclosure as a basis for designing or modifying other processes and structures for carrying out the same purposes and/or achieving the same advantages of the embodiments introduced herein. Those skilled in the art will also realize that such equivalent constructions do not depart from the spirit and scope of the present disclosure, and that they may make various changes, substitutions, and alterations herein without departing from the spirit and scope of the present disclosure.

What is claimed is:
1. An image sensor, comprising:
  a first chip comprising:
    a plurality of image sensing elements;
    transfer transistors and diffusion wells corresponding to the plurality of image sensing elements;
    a ground node centrally located on the first chip and shared by the plurality of image sensing elements;
    deep trench isolation (DTI) structures extending from the shared ground node and between adjacent image sensing elements of the plurality of image sensing elements, wherein the DTI structures divide the first chip into a plurality of sections, and wherein each section of the plurality of sections comprises an image sensing element of the plurality of image sensing elements;
a second chip bonded to the first chip and comprising a source follower, a reset transistor, a row select transistor, and an in-pixel circuit, wherein the source follower is electrically coupled to the diffusion wells; and
a third chip bonded to the second chip and comprising an application-specific circuit, wherein the application-specific circuit is electrically coupled to the in-pixel circuit.

2. The image sensor of claim 1, wherein each image sensing element of the plurality of image sensing elements comprises a photodiode, wherein the photodiode comprises a first doped region and a second doped region adjacent to the first doped region, and wherein the first and second doped regions comprise opposite dopants.

3. The image sensor of claim 1, wherein the source follower, the reset transistor, the row select transistor, and the in-pixel circuit are vertically displaced from the transfer transistors.

4. The image sensor of claim 1, wherein the application-specific circuit is vertically displaced from the source follower, the reset transistor, the row select transistor, and the in-pixel circuit.

5. The image sensor of claim 1, wherein each section of the plurality of sections comprises one image sensing element, one transfer transistor and one diffusion well.

6. The image sensor of claim 1, wherein the first chip further comprises color filters are disposed on the plurality of image sensing elements and micro lenses disposed on the color filters.

7. The image sensor of claim 1, wherein the first, second, and third chips further comprise an interconnect structure comprising a metal via, a metal line, a through-silicon via (TSV), and combinations thereof.

8. The image sensor of claim 1, wherein the in-pixel circuit comprises a column amplifier, a correlated double sampling (CDS) circuit, and combinations thereof.

9. The image sensor of claim 1, wherein the reset transistor is electrically coupled to the diffusion wells and the row select transistor is electrically coupled to the in-pixel circuit.

10. The image sensor of claim 1, wherein the application-specific circuit comprises an analog-to-digital converter (ADC), a counter, a memory storage device, and combinations thereof.

11. An image sensor, comprising:
a first chip comprising:
a first image sensing element and a second image sensing element;
a first transfer transistor and a second transfer transistor;
a diffusion well shared by the first and second image sensing elements;
a ground node centrally located on the first chip and shared by the first and second image sensing elements; and
a deep trench isolation (DTI) structure extending from the diffusion well and between the first and second image sensing elements, wherein the DTI structure extends between the ground node and an edge of the first chip;
a second chip bonded to the first chip and comprising a source follower, a reset transistor, a row select transistor, and an in-pixel circuit, wherein the source follower is electrically coupled to the diffusion well; and
a third chip bonded to the second chip and comprising an application-specific circuit, wherein the application-specific circuit is electrically coupled to the in-pixel circuit.

12. The image sensor of claim 11, wherein the first chip further comprises a first ground node corresponding to the first image sensing element and a second ground node corresponding to the second image sensing element.

13. The image sensor of claim 11, wherein the first chip further comprises a third image sensing element and a fourth image sensing element, wherein the first, second, third, and fourth image sensing elements share the diffusion well, and wherein the first chip further comprises:
an other DTI structure extending from the diffusion well and between the second and third image sensing elements;
a third DTI structure extending from the diffusion well and between the third and fourth image sensing elements; and
a fourth DTI structure extending from the diffusion well and between the first and fourth image sensing elements.

14. The image sensor of claim 11, wherein the first chip further comprises a first color filter disposed on the first image sensing element, a second color filter, different from the first color filter, disposed on the second image sensing element, and micro lenses disposed on the first and second color filters.

15. The image sensor of claim 11, wherein the first, second, and third chips further comprise an interconnect structure comprising a metal via, a metal line, a through-silicon via (TSV), and combinations thereof.

16. The image sensor of claim 11, wherein the in-pixel circuit comprises a column amplifier, a correlated double sampling (CDS) circuit, and combinations thereof, and wherein the application-specific circuit comprises an analog-to-digital converter (ADC), a counter, a memory storage device, and combinations thereof.

17. A device, comprising:
a first chip comprising an image sensing element, a transfer transistor, a diffusion well, and a first interconnect structure;
a floating node centrally located on the first chip;
deep trench isolation (DTI) structures that divide the first chip into a plurality of sections, wherein each section of the plurality of sections comprises the image sensing element, the transfer transistor, the diffusion well, and the first interconnect structure, and wherein each DTI structure extends between the floating node and an edge of the first chip;
a second chip bonded to the first chip, wherein the second chip comprises a source follower, a reset transistor, a row select transistor, an in-pixel circuit, and a second interconnect structure; and
a third chip bonded to the second chip, wherein the third chip comprises an application-specific circuit and a third interconnect structure.

18. The device of claim 17, further comprising:
a color filter on the image sensing element; and
a micro lens on the color filter.

19. The device of claim 17, wherein the image sensing element comprises:
a first region on a substrate of the first chip doped with a first dopant; and a second region adjacent to the first region doped with a second dopant opposite to the first dopant.

20. The device of claim 17, further comprising a through-silicon via (TSV) electrically coupled to the third interconnect structure.

* * * * *